US011651320B2

(12) United States Patent
Nishikawa et al.

(10) Patent No.: US 11,651,320 B2
(45) Date of Patent: May 16, 2023

(54) PRESENTATION DEVICE AND PRESENTATION METHOD

(71) Applicant: Panasonic Corporation, Osaka (JP)

(72) Inventors: Yuri Nishikawa, Kanagawa (JP); Jun Ozawa, Nara (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 36 days.

(21) Appl. No.: 16/801,460

(22) Filed: Feb. 26, 2020

(65) Prior Publication Data

US 2020/0193362 A1 Jun. 18, 2020

Related U.S. Application Data

(63) Continuation of application No. PCT/JP2018/046009, filed on Dec. 14, 2018.

(30) Foreign Application Priority Data

Jan. 11, 2018 (JP) .............................. JP2018-002837
Oct. 26, 2018 (JP) .............................. JP2018-201492

(51) Int. Cl.
G06Q 10/083 (2023.01)
G06Q 50/28 (2012.01)
G06Q 50/30 (2012.01)

(52) U.S. Cl.
CPC ........... *G06Q 10/083* (2013.01); *G06Q 50/28* (2013.01); *G06Q 50/30* (2013.01)

(58) Field of Classification Search
CPC ............................... G06Q 50/28; G06Q 50/30
(Continued)

(56) References Cited

U.S. PATENT DOCUMENTS

2011/0258134 A1* 10/2011 Mendez ................. G06Q 50/12
705/332
2016/0117740 A1* 4/2016 Linden ................... G06Q 50/01
705/14.66
(Continued)

FOREIGN PATENT DOCUMENTS

JP 2002-056078 2/2002
JP 2006-124099 5/2006
WO WO-2015092860 A1 * 6/2015 ........... G06Q 10/083

OTHER PUBLICATIONS

Effectiveness of Mobile Notification Delivery. Prasanta, Saikia et al. May 5, 2017. 2017 18th IEEE International Conference on Mobile Data Management (MDM). pp. 21-29. (Year: 2017).*
(Continued)

*Primary Examiner* — Jeff Zimmerman
*Assistant Examiner* — Hunter A Molnar
(74) *Attorney, Agent, or Firm* — Wenderoth, Lind & Ponack, L.L.P.

(57) ABSTRACT

A delivery notification mail for notifying each of users of information regarding a corresponding one of packages to be delivered by a delivery vehicle is transmitted to a first information terminal (2) owned by the user. Opening time information indicating an opening time of each of the delivery notification mails is received from the corresponding first information terminal (2). A degree of interest of each of the users in the corresponding package is calculated. The degree of interest is calculated on the basis of a difference between a transmission time of the delivery notification mail corresponding to each of the packages and the opening time indicated by the opening time information. Order of delivery of the packages is set on the basis of the
(Continued)

degrees of interest. Delivery order information indicating the order of delivery is transmitted to a second information terminal (3).

22 Claims, 23 Drawing Sheets

(58) Field of Classification Search
USPC .......................................................... 705/330
See application file for complete search history.

(56) References Cited

U.S. PATENT DOCUMENTS

| 2016/0140624 | A1* | 5/2016 | Fukuda | G06Q 10/107 |
| | | | | 705/14.66 |
| 2017/0061367 | A1* | 3/2017 | Zhang | G06F 16/29 |
| 2017/0147976 | A1* | 5/2017 | Koch | G06Q 10/0836 |
| 2017/0161680 | A1* | 6/2017 | Hong | G06Q 10/0836 |
| 2018/0357591 | A1* | 12/2018 | Bell | G06Q 30/0261 |

OTHER PUBLICATIONS

International Search Report of PCT application No. PCT/JP2018/046009 dated Feb. 19, 2019.

\* cited by examiner

FIG. 8

| USER ID | ORDER NUMBER | MAIL TRANSMISSION TIME | MAIL OPENING TIME |
|---|---|---|---|
| U001234 | 11-22-333 | 10/16/2017 15:36 | 10/16/2017 15:38 |
| U001234 | 11-22-333 | 10/17/2017 12:05 | 10/17/2017 12:10 |
| U001234 | 11-22-333 | 10/17/2017 17:30 | N/A |
| ... | ... | ... | ... |

| USER ID | ORDER NUMBER | NOTIFICATION TRANSMISSION TIME | NOTIFICATION OPENING TIME |
|---|---|---|---|
| U001234 | 11-22-333 | 10/16/2017 15:36 | 10/16/2017 15:38 |
| U001234 | 11-22-333 | 10/17/2017 12:05 | 10/17/2017 12:10 |
| U001234 | 11-22-333 | 10/17/2017 17:30 | N/A |
| ... | ... | ... | ... |

T3

| USER ID | SCREEN TYPE | VISIT TIME | LEAVING TIME | ORDER NUMBER |
|---|---|---|---|---|
| U001234 | NOTIFICATION | 10/16/2017 15:38 | 10/16/2017 15:39 | 11-22-333 |
| U001234 | DELIVERY TRACKER | 10/17/2017 18:20 | 10/17/2017 18:25 | 11-22-333 |
| ... | ... | ... | ... | ... |

FIG. 14

| USER ID | SITE TYPE | VISIT TIME | LEAVING TIME | ORDER NUMBER |
|---|---|---|---|---|
| U001234 | MY PAGE FIRST SCREEN | 10/16/2017 15:38 | 10/16/2017 15:38 | — |
| U001234 | NOTIFICATION | 10/16/2017 15:38 | 10/16/2017 15:40 | 11-22-333 |
| ... | ... | ... | ... | ... |

| ORDER NUMBER | ADDRESSER | DETAILS | OUTER DIMENSIONS/ WEIGHT | ENGAGEMENT INDEX |
|---|---|---|---|---|
| 11-22-333 | QQQ | FOUR KITCHEN ROLLS | 800×400×400 800 g | 0.2 |
| 44-55-666 | PPP | COSMETICS | 300×100×50 450 g | 0.9 |

T5

CURRENT PACKAGE (TARGET PACKAGE)

| 77-88-999 | RRR | CLOTHES | 700×400×200 600 g | 0.7 |
|---|---|---|---|---|

T6

| ORDER NUMBER | USER ID | SCHEDULED DELIVERY DATE | SCHEDULED DELIVERY TIME |
|---|---|---|---|
| 11-22-333 | U001234 | 10/17/2017 | 18:00 – 20:00 |
| 11-44-555 | U004321 | 10/18/2017 | 14:00 – 16:00 |
| ... | ... | ... | ... |

PRESENTATION DEVICE AND PRESENTATION METHOD

BACKGROUND

1. Technical Field

The present disclosure relates to a technique for determining order of delivery of packages to be delivered by a delivery vehicle.

2. Description of the Related Art

A technique for holding in advance service available range information, which specifies products handled within a traveling range of a delivery vehicle, and, if a user requests immediate delivery of a product using a terminal, and if the product is handled within the traveling range and a location of the user is within the traveling range, delivering the product to the user on the same day is known (refer to Japanese Unexamined Patent Application Publication No. 2006-124099).

In addition, a technique for, if a user uses a taxi service using a user terminal, identifying a position of the user terminal and notifying a provider of the taxi service of information regarding the identified position is known (refer to Japanese Unexamined Patent Application Publication No. 2002-56078).

SUMMARY

The techniques disclosed in Japanese Unexamined Patent Application Publication No. 2006-124099 and Japanese Unexamined Patent Application Publication No. 2002-56078 need to be further improved.

One non-limiting and exemplary embodiment provides a technique for automatically classifying packages to take priority in delivery and other packages and setting appropriate order of delivery without a necessity for a user to explicitly input an urgency level of delivery of a package.

In one general aspect, the techniques disclosed here feature a presentation device that presents order of delivery of packages to be delivered by a delivery vehicle. The presentation device includes a processor and a communicator. The communicator is communicably connected to one or more first information terminals, which are information terminals owned by one or more users to which the packages are to be delivered, and a second information terminal, which is an information terminal provided for the delivery vehicle, over a certain network, transmits delivery notification information for notifying each of the users of information regarding the corresponding package to the first information terminal owned by the user, and receives viewing time information indicating a viewing time of the delivery notification information from each of the first information terminals. The processor calculates a degree of interest of each of the users in the corresponding package and sets the order of delivery of the packages on a basis of the degrees of interest, each of which is calculated on the basis of a difference between a transmission time of the delivery notification information corresponding to the package and the viewing time indicated by the viewing time information. The communicator transmits delivery order information indicating the order of delivery to the second information terminal.

According to the present disclosure, packages to take priority in delivery and other packages can be automatically classified and appropriate order of delivery can be set without a necessity for a user to explicitly input an urgency level of delivery of a package.

It should be noted that this general or specific aspect may be implemented as a method, a system, an integrated circuit, a computer program, a computer-readable storage medium, or any selective combination thereof. The computer-readable storage medium may be a nonvolatile storage medium such as a compact disc read-only memory (CD-ROM).

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 8 is a diagram illustrating an example of an opening history table indicating a user's opening history of delivery notification mails;

FIG. 12 is a diagram illustrating an example of an opening history table indicating the user's opening history of messages on the delivery condition app and a visit history table indicating the user's visit history on the delivery condition app;

FIG. 14 is a diagram illustrating an example of a web visit history table used when a mode in which a website provides the delivery condition notification service is employed;

FIG. 15 is a diagram illustrating an example of the data structure of a delivery history table and an example of the data structure of a package table in which information regarding a target package is registered;

DETAILED DESCRIPTION

Figure 1:
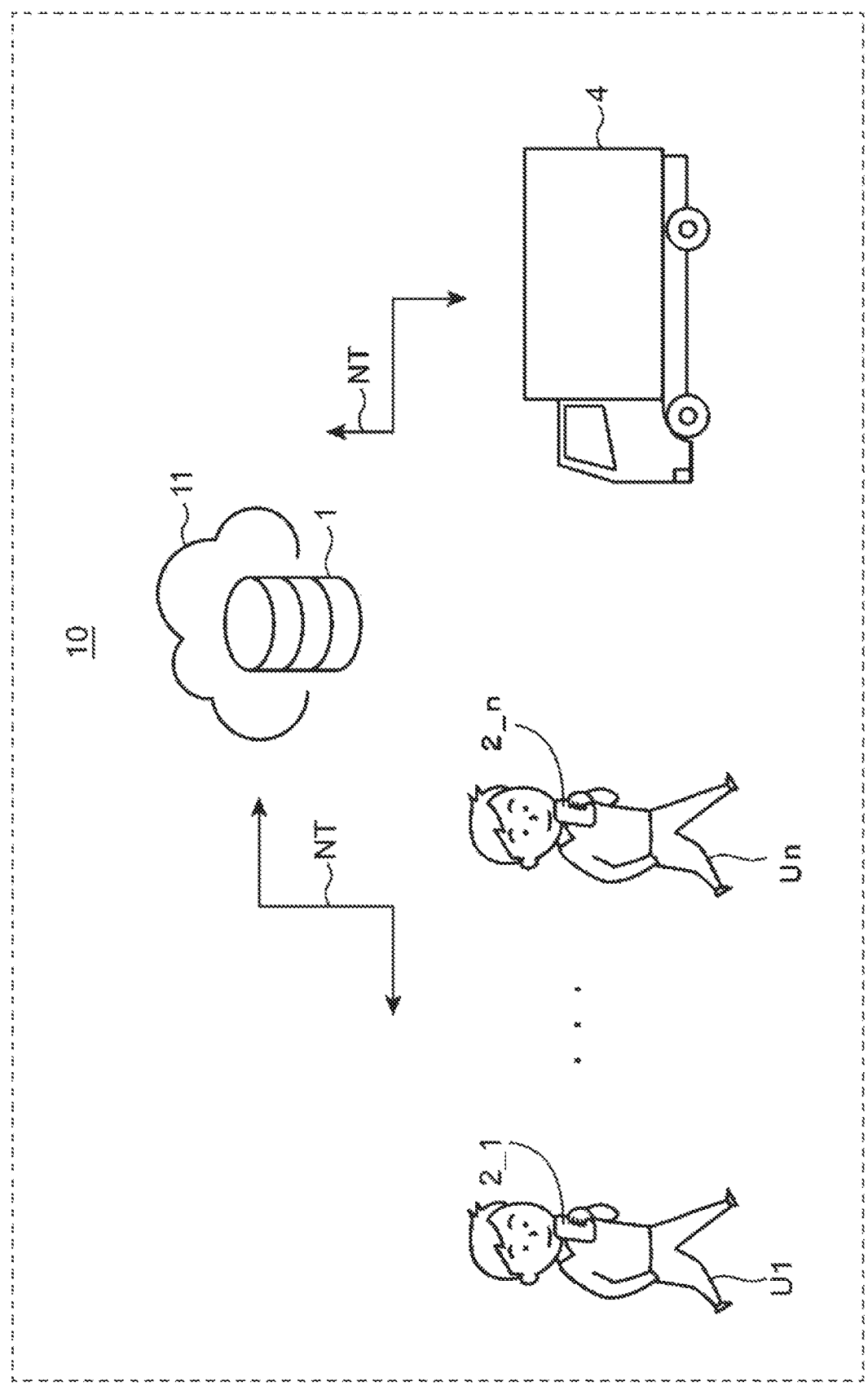
FIG. 1 is a diagram illustrating an example of the network configuration of a presentation system according to an embodiment of the present disclosure.

Underlying Knowledge Forming Basis of Present Disclosure

These years, online shopping, where a user uses an information terminal to access a website that sells products order a product and then the product is delivered the user's house, has gained great popularity. In online shopping, a user can request delivery of a product (package) in a more prioritized manner than other packages by specifying a delivery date.

When a user desires prioritized delivery of a package, current physical distribution systems used for online shopping require the user to input an urgency level of delivery, which puts a burden on the user. That is, there is a problem in the current physical distribution systems in that it is difficult to automatically classify packages to take priority in delivery and other packages and set appropriate order of delivery without a necessity for a user to explicitly input an urgency level of delivery of a package.

In addition, some users are greatly interested in packages but do not explicitly input a level of urgency because of a reluctance to pay an additional charge. In conventional physical distribution systems, however, packages for such users are left over, and the users' desires are not taken into consideration. If users' potential interest in packages can be gathered and reflected by order of delivery, therefore, a physical distribution system useful in improving the users' satisfaction can be achieved.

Since the user is required to make an input about immediate delivery in Japanese Unexamined Patent Application Publication No. 2006-124099, it is difficult to address the above-described problem of the conventional physical distribution systems. Japanese Unexamined Patent Application Publication No. 2002-56078, on the other hand, relates to allocation of taxis, and a technical field thereof is different from that of the present disclosure. In addition, because it is only required that a single taxi be allocated to a current position of a user, order of allocation of taxis need not be set. In this example of the related art, therefore, the above-described problem of the current physical distribution systems does not arise.

When a user has ordered a product in a current physical distribution system, a mail indicating acceptance of the order, a mail indicating that delivery of the product has been assigned to a shipping company, and the like are transmitted to the user. A user who is greatly interested in a product (package) is assumed to open these mails promptly. The present inventor has therefore inferred that a degree of interest of a user in a package can be estimated using an activity history of the user without an explicit input from the user.

The present disclosure has been conceived on the basis of such knowledge and aims to provide a technique for automatically classifying packages to take priority in delivery and other packages and setting appropriate order of delivery without a necessity for a user to explicitly input an urgency level of delivery of a package.

A presentation apparatus according to an aspect of the present disclosure is a presentation device that presents order of delivery of packages to be delivered by a delivery vehicle. The presentation device includes a processor and a communicator. The communicator is communicably connected to one or more first information terminals, which are information terminals owned by one or more users to which the packages are to be delivered, and a second information terminal, which is an information terminal provided for the delivery vehicle, over a certain network, transmits delivery notification information for notifying each of the users of information regarding the corresponding package to the first information terminal owned by the user, and receives viewing time information indicating a viewing time of the delivery notification information from each of the first information terminals. The processor calculates a degree of interest of each of the users in the corresponding package and sets the order of delivery of the packages on a basis of the degrees of interest, each of which is calculated on the basis of a difference between a transmission time of the delivery notification information corresponding to the package and the viewing time indicated by the viewing time information. The communicator transmits delivery order information indicating the order of delivery to the second information terminal.

According to this aspect, a degree of interest is calculated on the basis of a difference between a transmission time and a viewing time of delivery notification information corresponding to each package, and order of delivery is set on the basis of the degrees of interest. That is, in this aspect, a degree of interest is estimated while focusing on a tendency that a user who is greatly interested in a package to be delivered will immediately view delivery notification information received by a first information terminal. In this aspect, therefore, appropriate order of delivery can be set by automatically classifying packages to take priority in delivery and other packages without a necessity for a user to explicitly input a level of urgency of delivery.

In the above aspect, the processor may calculate a higher degree of interest for a package whose difference is smaller and set a package with a higher degree of interest higher in the order of delivery.

According to this aspect, a higher degree of interest is calculated as a difference between a transmission time and a viewing time of delivery notification information becomes smaller, and a package with a high degree of interest is set high in order of delivery. A package with a high degree of interest, therefore, can be delivered to a user more promptly.

In the above aspect, the processor may calculate a higher degree of interest for a package whose difference is smaller, classify each of the packages into one of classes corresponding to different degrees of interest, determine candidates for each of delivery periods such that the classes have different time spans, transmit the candidates for one of the delivery periods to each of the first information terminals, obtain, from the first information terminal, a desired delivery period selected by the corresponding user from the candidates for the delivery period, and set the order of delivery of the packages such that the packages are delivered within the corresponding desired delivery periods.

According to this aspect, packages are classified into different classes in accordance with degrees of interest, and candidates for each of delivery periods are determined such that a time span becomes different in accordance with the class and transmitted to a first information terminal. In this aspect, therefore, a time span for the candidates for each of the delivery periods can be set shorter for a package belonging to a class corresponding to a higher degree of interest. As a result, a user corresponding to the package belonging to the class corresponding to a higher degree of interest can select a desired delivery period more finely and receive the package in a timely manner.

In the above aspect, the processor may set a shorter time span for the candidates for the delivery period for a class corresponding to a higher degree of interest.

According to this aspect, a shorter time span for candidates for a delivery period is set for a class corresponding to a higher degree of interest. A user corresponding to the package belonging to the class corresponding to a higher degree of interest, therefore, can select a desired delivery period more finely than users corresponding to packages belonging to classes corresponding to lower degrees of interest and receive the package in a timely manner.

In the above aspect, the processor may determine the candidates for the delivery period within first operation hours for a package belonging to a first class and the candidates for the delivery period within second operation hours including a period other than the first operation hours and the first operation hours.

According to this aspect, candidates for the delivery period are determined within the first operation hours for a package belonging to the first class and candidates for the delivery period are determined within the second operation hours including a period other than the first operation hours and the first operation hours. A user corresponding to the package belonging to the second class can therefore select a desired delivery period within the second operation hours, which are longer than the first operation hours. As a result, whereas a user corresponding to the package belonging to the first class can select a desired delivery period only in the daytime, for example, the user corresponding to the package belonging to the second class can select a desired delivery period in the nighttime and early morning as well as the daytime. Consequently, a user whose degree of interest is high can feel prioritized and can be effectively differentiated from users whose degrees of interest are low.

Because a delivery vehicle is driven by a driver today, a deliverable period is limited to working hours of the drivers, namely, for example, 9 to 21. Self-driving delivery vehicles for delivering packages, however, are expected to spread in the future as a result of evolution of AI technologies. Working hours of drivers need not be taken into consideration as deliverable periods in this case, and packages can be delivered around the clock. In this aspect, therefore, a user whose degree of interest is high can feel effectively prioritized especially when self-driving delivery vehicles for delivering packages have spread.

In the above aspect, if there are, among the packages, two or more packages whose destinations are in a same apartment house, building, or site and that belong to a certain class, the processor may classify, among the two or more packages belonging to the certain class, a top certain number of packages into the certain class and the other packages into a class corresponding to a degree of interest lower than a degree of interest corresponding to the certain class.

It is assumed, for example, that there are packages belonging to a certain class whose destinations are in the same apartment house. A period of 9:00 to 9:30, for example, is selected for one of the packages (first package) as a desired delivery period. A period of 10:00 to 10:30, for example, is selected for another package (second package) as a desired delivery period. In this case, a delivery vehicle needs to come back to the apartment house to deliver the second package after delivering the first package, which decreases delivery efficiency.

In this aspect, for example, if there are two or more packages whose destinations are in the same apartment house and that belong to a certain class, the processor classifies a top certain number of packages into the certain class and the other packages into a class corresponding to a degree of interest lower than a degree of interest corresponding to the certain class. As a result, even if a period of 9:00 to 9:30 is selected as the desired delivery period for the first package, for example, a period (e.g., 9:00 to 11:00) including the desired delivery period for the first package and longer than the desired delivery period for the first package can be selected as the desired delivery period for the second period. As a result, the delivery vehicle needs to return to the same apartment house less often, which improves delivery efficiency.

In the above aspect, if there are, among the packages, two or more packages whose destinations are located within a certain radius and that belong to a certain class, the processor may classify, among the two or more packages belonging to the certain class, a top certain number of packages into the certain class and the other packages into a class corresponding to a degree of interest lower than a degree of interest corresponding to the certain class.

It is assumed that there are two or more packages whose destinations are located within a certain radius and that belong to a certain class. A period of 9:00 to 9:30, for example, is selected for one of the packages (first package) as a desired delivery period. A period of 10:00 to 10:30, for example, is selected for another package (second package) as a desired delivery period. In this case, a delivery vehicle needs to come back to the apartment house to deliver the second package after delivering the first package, which decreases delivery efficiency.

According to this aspect, if there are two or more packages whose destinations are within a certain radius and that belong to a certain class, a top certain number of packages are classified into the certain class and the other packages are classified into a class corresponding to a degree of interest lower than a degree of interest corresponding to the certain class. As a result, even if a period of 9:00 to 9:30 is selected as the desired delivery period for the first package, for example, a period (e.g., 9:00 to 11:00) including the desired delivery period for the first package and longer than the desired delivery period for the first package can be selected as the desired delivery period for the second period. As a result, the delivery vehicle needs to return to the same apartment house less often, which improves delivery efficiency.

In the above aspect, the information regarding each of the packages may include at least an identifier for uniquely identifying the package.

According to this aspect, the information regarding each of the packages includes at least an identifier for uniquely identifying the package, and the packages and the first information terminals to which the packages are to be delivered can be easily associated with each other.

In the above aspect, the information regarding each of the packages may further include information indicating a scheduled delivery date or a scheduled delivery time of the package, a current position of the package, and a delivery condition of the package.

According to this aspect, the information regarding each of the packages further includes information indicating a scheduled delivery date or a scheduled delivery time of the package, a current position of the package, and a delivery condition of the package. A user who is greatly interested in a package is therefore motivated to view delivery notification information.

In the above aspect, the presentation device may further include a memory. The memory may store a delivery schedule table on which an identifier for uniquely identifying each of the packages and a scheduled delivery date and a scheduled delivery time of the package are associated with each other. The one or more first information terminals may be used to view information regarding the corresponding packages. If an identifier input by one of the users is obtained from the corresponding first information terminal, the processor may identify, on the delivery schedule table, a scheduled delivery date or a scheduled delivery time corresponding to the identifier and transmits the identified scheduled delivery date or scheduled delivery time to the first information terminal. The first information terminal may output the transmitted scheduled delivery date or scheduled delivery time.

According to this aspect, if a user inputs an identifier of a package to a first information terminal, the presentation device transmits a scheduled delivery date or a scheduled delivery time corresponding to the identifier to the first information terminal. The user can therefore easily check a scheduled delivery date or a scheduled delivery time of a package by performing an operation for inputting an identifier of the package to the first information terminal.

In the above aspect, the processor may detect a viewing time at which each of the users has viewed the scheduled delivery date or the scheduled delivery time of the corresponding package. The degree of interest may be calculated on the basis of a difference between the transmission time of the delivery notification information corresponding to each of the packages and the detected viewing time.

According to this aspect, a degree of interest is calculated using a difference between a transmission time of delivery notification information and a viewing time at which the user has viewed a scheduled delivery date or a scheduled delivery time using the first information terminal.

A presentation device according to another aspect of the present disclosure is a presentation device that presents order of delivery of packages to be delivered by a delivery vehicle. The presentation device includes a processor and a communicator. The communicator is communicably connected to one or more first information terminals, which are information terminals owned by one or more users to which the packages are to be delivered, and a second information terminal, which is an information terminal provided for the delivery vehicle, over a certain network, transmits delivery notification information for notifying each of the users of information regarding the corresponding package to the first information terminal owned by the user, and receives viewing information indicating that the delivery notification information has been viewed on the first information terminal from each of the first information terminals. The processor calculates a degree of interest of each of the users in the corresponding package and sets the order of delivery of the packages on a basis of the degrees of interest, each of which is calculated on the basis of a viewing ratio of the delivery notification information calculated from the viewing information corresponding to the package. The communicator transmits delivery order information indicating the order of delivery to the second information terminal.

According to this aspect, a degree of interest of each of the users in the corresponding package is calculated on the basis of a viewing ratio of delivery notification information calculated from viewing information corresponding to the package, and the order of delivery of the packages is set on the basis of the degrees of interest. When a certain package is delivered to a user, for example, delivery notification information such as a mail indicating acceptance of a request when the user has requested delivery, a mail for notifying the user of assignment of the package to a shipping company, and a mail for notifying the user of a scheduled delivery time of the package might be transmitted to the first information terminal. In this aspect, a degree of interest is estimated while focusing on a fact that a viewing ratio of these mails tends to become high for a user who is greatly interested in a package. In this aspect, therefore, appropriate order of delivery can be set by automatically classifying packages to take priority in delivery and other packages without a necessity for the user to explicitly input a level of emergency of delivery.

A presentation device according to yet another aspect of the present disclosure is a presentation device that presents order of delivery of packages to be delivered by a delivery vehicle. The presentation device includes a processor and a communicator. The communicator is communicably connected to one or more first information terminals, which are information terminals owned by one or more users to which the packages are to be delivered, and a second information terminal, which is an information terminal provided for the delivery vehicle, over a certain network. The one or more first information terminals are used to view information regarding the corresponding packages. The communicator receives a viewing history of each of the users about the information regarding the corresponding package from the corresponding first information terminal. The processor calculates a degree of interest of each of the users in the corresponding package and sets the order of delivery of the packages on a basis of the degrees of interest, each of which is calculated on the basis of viewing duration of the information regarding the corresponding package calculated from the viewing history corresponding to the package. The communicator transmits delivery order information indicating the order of delivery to the second information terminal.

According to this aspect, a user's viewing duration of information regarding a corresponding package is calculated from the user's viewing history corresponding to the information regarding the package, a degree of interest of the user is calculated on the basis of the viewing duration, and order of delivery of packages is set on a basis of the degrees of interest. That is, in this aspect, a degree of interest is estimated while focusing on a fact that viewing duration of information regarding a package tends to become longer for a user who is greatly interested in a package. In this aspect, therefore, appropriate order of delivery can be set by automatically classifying packages to take priority in delivery and other packages without a necessity for a user to explicitly input a level of urgency of delivery.

A presentation device according to yet another aspect of the present disclosure is a presentation device that presents order of delivery of packages to be delivered by a delivery vehicle. The presentation device includes a processor, a communicator, and a memory. The memory stores a delivery history in which degrees of interest of one or more users, to whom the packages are to be delivered, in packages delivered in past and attribute information indicating attributes of the packages delivered in the past are associated with each other. The communicator is communicably connected to one or more first information terminals, which are information terminals owned by the one or more users, and a second information terminal, which is an information terminal provided for the delivery vehicle, over a certain network and receives attribute information regarding the packages to be delivered. The processor estimates the degree of interest of each of the one or more users in the corresponding package on a basis of a level of similarity between a feature value of the attribute information included in the delivery history and a feature value of the received attribute information for the user, sets the order of delivery of the packages on the basis of the degrees of interest, and transmits delivery order information indicating the order of delivery to the second information terminal.

According to this aspect, a delivery history in which attribute information regarding packages delivered to one or more users in the past and degrees of interest of the users in the packages are associated with each other is stored in a memory. A degree of interest of each of the one or more users in a package to be delivered is estimated on the basis of a level of similarity between a feature value of the attribute information included in the delivery history and a feature value of attribute information regarding the package to be delivered. That is, in this aspect, a degree of interest of a user in a package to be delivered is estimated while focusing on a fact that the degree of interest is correlated with degrees of interest of the user in packages that have been delivered in the past and that have the same attribute information as the package to be delivered. In this aspect, therefore, appropriate order of delivery can be set by automatically classifying packages to take priority in delivery and other packages without a necessity for a user to explicitly input a level of urgency of delivery.

In the above aspect, the processor may set a package with higher degree of interest higher in the order of delivery.

According to this aspect, a package with a higher degree of interest is set higher in order of delivery. A package with a higher degree of interest, therefore, can be delivered to a user more promptly.

In the above aspect, the packages may include locker delivery packages, which are to be delivered to package lockers. The communicator may receive empty information, which indicates empty package lockers, from a third information terminal that manages the empty lockers. If determining on the basis of the empty information that a number of package lockers is not enough to store all the locker delivery packages, the processor may set order of storage of the locker delivery packages in the package lockers in descending order of the degree of interest. The communicator may transmit storage order information, which indicates the order of storage, to the second information terminal.

In this aspect, if it is difficult to store all packages in package lockers, order of storage of packages is set in descending order of the degree of interest. Packages with higher degrees of interest, therefore, can take priority in storage in the package lockers. Here, a user who is greatly interested in a package is likely to take out the package from a delivery locker promptly. In this aspect, therefore, a sufficient number of empty package lockers can be secured even through the capacity of the package lockers is limited.

In the above aspect, the communicator may receive departure information, which indicates that the delivery vehicle has left a delivery center. If receiving the departure information, the processor may calculate an estimated delivery time of each of the packages on the basis of a reception time of the departure information and a destination of the package and identify, as a premium user, a user whose degree of interest is equal to or higher than a threshold. The communicator may transmit the estimated delivery time to the first information terminal owned by the premium user.

According to this aspect, a premium user, whose degree of interest is equal to or higher than a threshold, is notified of an estimated delivery time of a package after a delivery vehicle leaves a delivery center to deliver the package to the premium user. A considerate service, therefore, can be provided for premium users.

In the above aspect, if detecting that a destination of a package for the premium user is located within a certain range from a current position of the delivery vehicle, the processor may notify the first information terminal owned by the premium user that the package will soon be delivered.

According to this aspect, a premium user is notified, when a delivery vehicle has entered a certain range from a destination of a package, that the package will soon be delivered. A more considerate service, therefore, may be provided for premium users.

In the above aspect, the communicator may receive positional information indicating a current position of the delivery vehicle and traffic information regarding a delivery area of the delivery vehicle. The processor may calculate an estimated delivery time of a package for the premium user on the basis of the received positional information and traffic information, present time, and a destination of the package for the premium user and correct, if determining that the calculated estimated delivery time is later than an estimated delivery time that has already been transmitted to the premium user, the order of delivery such that the package for the premium user will be delivered before the estimated delivery time that has already been transmitted to the premium user. The communicator may transmit the corrected delivery information to the second information terminal.

According to this aspect, even if a situation in which it is difficult to deliver a package before an estimated delivery time due to a traffic jam or the like occurs, order of delivery is corrected such that the package will be delivered before the estimated delivery time, insofar as the package is for a premium user. A more considerate service, therefore, can be provided for premium users.

In the above aspect, the communicator may receive nondelivery information, which indicates that one of the packages has not been delivered, from the second information terminal. If the nondelivery information is received and a user corresponding to the package that has not been delivered is a premium user, whose degree of interest is equal to or higher than a threshold, the processor may generate nondelivery notification information for notifying the premium user that the package has not been delivered. The communicator may transmit the nondelivery notification information to the first information terminal owned by the premium user.

According to this aspect, even if a delivery vehicle fails to deliver a package to a user, the delivery vehicle might be able to deliver the package to the user immediately by notifying the user of the failure to deliver the package to the user, when the user was out in the neighborhood at a time of delivery or at home but was doing something that prevented the user from answering the door. In this aspect, nondelivery notification information is transmitted to a user if a delivery vehicle fails to deliver a package to the user, insofar as the user is a premium user. Packages, therefore, can be promptly delivered to premium users.

In the above aspect, the communicator may receive positional information indicating a current position of the first information terminal. The processor may extract, from the packages, packages whose destinations are located within a certain range from the current position and set the order of delivery of the extracted packages on the basis of the corresponding degrees of interest.

According to this aspect, order of delivery of packages whose destinations are located within a certain range from a current position of a delivery vehicle is set, but order of delivery of packages whose destinations are not located within the certain range from the current position of the delivery vehicle is not set. A processing burden when order of delivery is set, therefore, can be reduced.

Embodiment

Network Configuration

FIG. 1 is a diagram illustrating a network configuration of a presentation system 10 according to an embodiment of the present disclosure. The presentation system 10 presents, to a driver of a delivery vehicle 4, order of delivery of packages to be delivered by the delivery vehicle 4. The driver of the delivery vehicle 4 delivers the packages in the order of delivery presented thereto.

Figure 2:
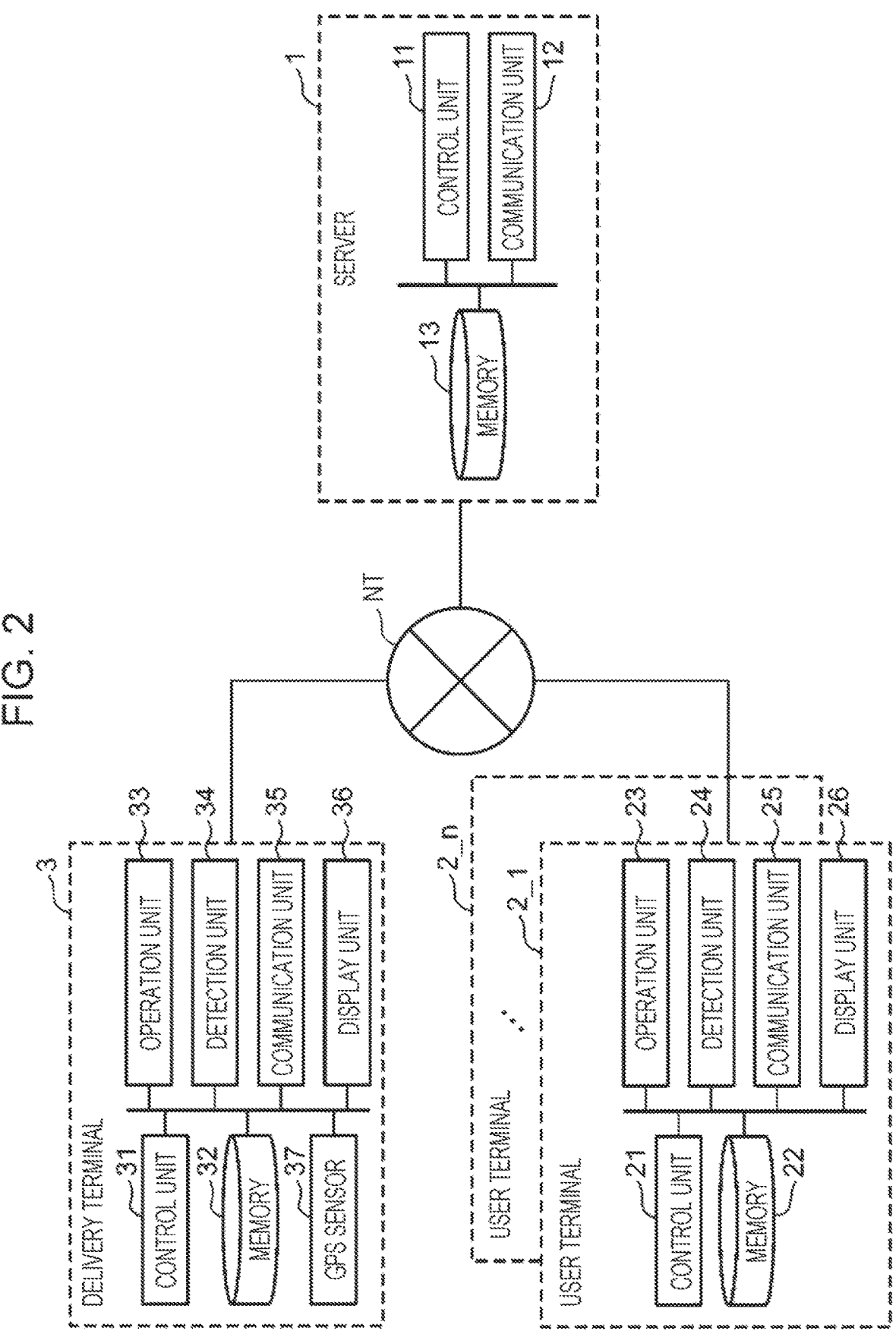
FIG. 2 is a block diagram illustrating an example of a detailed configuration of the presentation system illustrated in FIG. 1.

The presentation system 10 includes a server 1 (an example of a presentation device), user terminals 2_1 to 2_n (an example of first information terminals), and a delivery terminal 3 (an example of a second information terminal; refer to FIG. 2). The server 1, the user terminals 2, and the delivery terminal 3 are communicably connected to one another over a network NT. The server 1 may be, for example, a server managed by an online shopping company that manages a shopping website or a server managed by a shipping company that delivers products purchased on shopping websites to users.

The network NT includes the Internet, a mobile phone communication network, and a public telephone network.

The server 1 is, for example, a cloud server including one or more computers. The cloud server that serves as the server 1 includes a processor, such as a central processing unit (CPU) or a field-programmable gate array (FPGA), and a memory.

The user terminals 2 are, for example, mobile information terminals such as smartphones, button-type mobile phones, or tablet terminals. This, however, is just an example, and the user terminals 2 may be stationary information terminals, instead.

In the example illustrated in FIG. 1, there are n user terminals 2, namely the user terminal 2_1 of a user U1 to the user terminal 2_n of a user Un (n is an integer equal to or larger than 2).

The delivery terminal 3 may be, for example, a computer installed in the delivery vehicle 4 or a mobile information terminal carried by the driver of the delivery vehicle 4. The computer installed in the delivery vehicle 4 may be, for example, a car navigation system or a computer equipped by the delivery vehicle 4 other than the car navigation system.

The mobile information terminal carried by the driver may be a smartphone, a button-type mobile phone, or a tablet terminal.

FIG. 2 is a block diagram illustrating an example of a detailed configuration of the presentation system 10 illustrated in FIG. 1. The server 1 includes a control unit 11, a communication unit 12 (an example of a communicator), and a memory 13. The control unit 11 is a processor such as a CPU and executes a program that causes a computer to function as the presentation device in the present disclosure. The program may be downloaded over the network NT or stored in a non-transitory computer-readable storage medium.

The communication unit 12 is, for example, a communication circuit for connecting the server 1 to the network NT. The communication unit 12 transmits, to the user terminals 2, delivery notification mails for notifying the users of information regarding packages and, to the delivery terminal 3, delivery order information indicating order of delivery.

The memory 13 is a nonvolatile storage device and stores the program for causing a computer to function as the presentation device, engagement indices (an example of degrees of interest), which will be described later, and tables necessary to set order of delivery of packages.

The user terminals 2 each include a control unit 21, a memory 22, an operation unit 23, a detection unit 24, a communication unit 25, and a display unit 26. In FIG. 2, there are n user terminals 2_1 to 2_n corresponding to the n users (n is an integer equal to or larger than 2). The user U1 owns the user terminal 2_1, and the user Un owns the user terminal 2_n.

The control unit 21 is a processor such as a CPU and controls the entirety of the user terminal 2. The memory 22 is a nonvolatile storage device, for example, and stores an application program for presenting information regarding packages to a user.

The operation unit 23 is an input device such as a touch panel or a keyboard and a mouse and receives operations performed by the user.

The detection unit 24 is, for example, an electrical circuit that detects the user's operations received by the operation unit 23.

The communication unit 25 is, for example, a communication circuit for connecting the user terminal 2 to the network NT. In the present disclosure, the communication unit 25 transmits, to the server 1, data indicating that the user has opened a delivery notification mail and receives a delivery notification mail transmitted from the server 1. An act of "opening" herein may also refer to an act of "viewing". In addition, when the user terminal 2 has detected an instruction to select an outline of a message displayed on the display unit 26, it may be determined that the user terminal 2 has detected opening of the message corresponding to the outline.

The display unit 26 is a display such as a liquid crystal display or an organic electroluminescent (EL) display and displays information regarding packages to the user.

The delivery terminal 3 includes a control unit 31, a memory 32, an operation unit 33, a detection unit 34, a communication unit 35, a display unit 36, and a global positioning system (GPS) sensor 37. The control unit 31 is a processor such as a CPU and controls the entirety of the delivery terminal 3. The memory 32 is a nonvolatile storage device, for example, and stores an application program for presenting delivery order information to the driver.

The operation unit 33 is an input device such as a touch panel or a keyboard and receives operations performed by the driver.

The detection unit 34 is, for example, an electrical circuit that detects the driver's operations received by the operation unit 33.

The communication unit 35 is, for example, a communication circuit for connecting the delivery terminal 3 to the network NT. In the present disclosure, the communication unit 35 receives, from the server 1, delivery order information indicating order of delivery of packages and transmits, to the server 1, departure information, which indicates that the delivery vehicle 4 has left a delivery center, and positional information regarding the delivery terminal 3 periodically calculated by the GPS sensor 37 for the server 1.

The display unit 36 is a display such as a liquid crystal display or an organic EL display, for example, and displays an image indicating order of delivery to present the order of delivery to the user. When the delivery terminal 3 is a car navigation system, the display unit 36 is a display of the car navigation system.

The GPS sensor 37 receives signals transmitted from GPS satellites and calculates a current position of the delivery terminal 3 on the basis of the received signals.

Sequence

Figure 3:
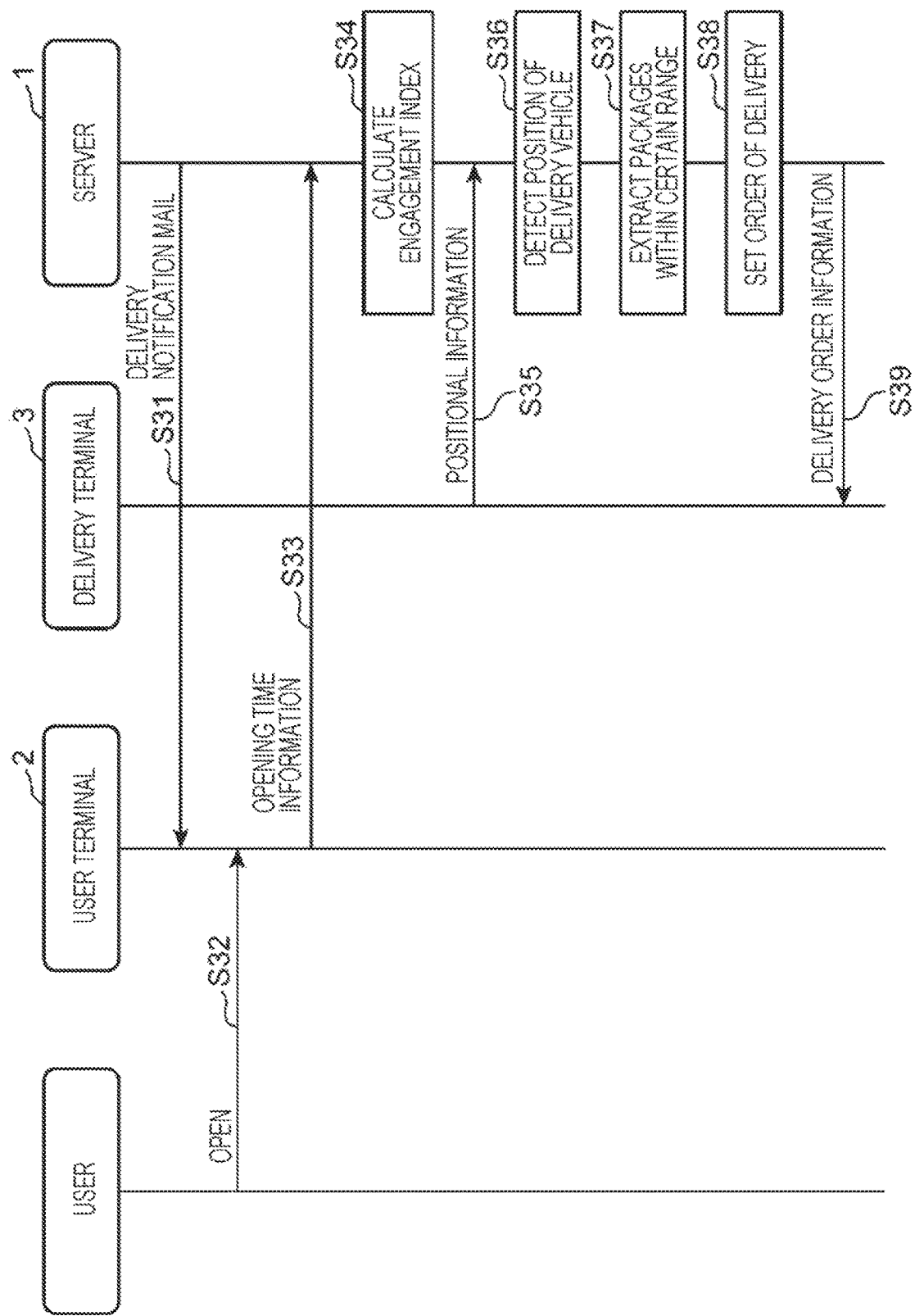
FIG. 3 is a diagram illustrating an outline of a process performed by the presentation system illustrated in FIG. 2.

FIG. 3 is a sequence diagram illustrating an outline of a process performed by the presentation system 10 illustrated in FIG. 2. FIG. 3 illustrates an outline of a process at a time when a mode in which an engagement index is calculated on the basis of an opening condition of a delivery notification mail is employed. This, however, is just an example. The sequence diagram of FIG. 3 may be employed whichever one of modes, which will be described later, for calculating an engagement index may be employed.

The sequence diagram of FIG. 3 is roughly divided into two phases. In a first phase, which is represented by S31 to S34, engagement indices of users with regard to packages are calculated from opening conditions of delivery notification mails. In a second phase, which is represented by S36 to S39, order of delivery of packages is determined on the basis of the engagement indices for the packages calculated in the first phase. The second phase is performed, for example, each time the delivery terminal 3 has transmitted positional information.

In FIG. 3, a case will be described where a single delivery vehicle 4 delivers packages. The packages whose order of delivery is to be determined hereinafter, therefore, are loaded into the delivery vehicle 4. Order of delivery of packages loaded into another delivery vehicle 4 managed by the server 1 is also determined using the sequence diagram of FIG. 3.

First, the control unit 11 of the server 1 transmits, using the communication unit 12, a delivery notification mail to a user terminal 2 owned by a user to whom a corresponding package is to be delivered (S31). Here, for example, the delivery notification mail may be a receipt mail transmitted to the user when the user has purchased a product on a shopping website, an order completion mail transmitted to the user when delivery of the product has been assigned to a shipping company that handles the product, or a mail for notifying the user that the delivery vehicle 4 has just left a delivery center to deliver the product to the user.

Although not illustrated in FIG. 3, in S31, delivery notification mails MA1 to MAn corresponding to packages PA1 to PAn to be delivered by the delivery vehicle 4 are transmitted to the user terminals 2_1 to 2_n, respectively, in practice. That is, the server 1 transmits the delivery notification mail MA1 corresponding to the package PA1 to the user terminal 2_1, the delivery notification mail MA2 corresponding to the package PA2 to the user terminal 2_2, . . . , and the delivery notification mail MAn corresponding to the package PAn to the user terminal 2_n.

The server 1 transmits the delivery notification mail MA1 to the user terminal 2_1 at a transmission time ST1, the delivery notification mail MA2 to the user terminal 2_2 at a transmission time ST2, . . . , and the delivery notification mail MAn to the user terminal 2_n at a transmission time STn.

In S32, the user terminal 2 detects inputting of an instruction to open the delivery notification mail from the user and displays the delivery notification mail on the display unit 26 to the user. The user may input the instruction to open the delivery notification mail by, for example, selecting the delivery notification mail displayed on a touch screen.

Although not illustrated in FIG. 3, in S32, the user terminal 2_1 detects inputting of an instruction to open the delivery notification mail MA1 from a user U1 and displays the delivery notification mail MA1 on a display unit thereof to the user U1, the user terminal 2_2 detects inputting of an instruction to open the delivery notification mail MA2 from a user U2 and displays the delivery notification mail MA2 on a display unit thereof to the user U2, . . . , and the user terminal 2_n detects inputting of an instruction to open the delivery notification mail MAn from a user Un and displays the delivery notification mail MAn on a display unit thereof to the user Un.

In S33, the user terminal 2 transmits opening time information, which indicates a time at which the delivery notification mail was opened, to the server 1. The time at which the delivery notification mail was opened may be a time at which the user terminals 2 received an instruction to open the delivery notification mail from the user.

Although not illustrated in FIG. 3, in S33, the user terminal 2_1 may transmit, to the server 1, opening time information O1, which indicates an opening time OT1 at which the user terminal 2_1 received an instruction to open the delivery notification mail MA1 from the user U1, the user terminal 2_2 may transmit, to the server 1, opening time information O2, which indicates an opening time OT2 at which the user terminal 2_2 received an instruction to open the delivery notification mail MA2 from the user U2, . . . , and the user terminal 2_n may transmit, to the server 1, opening time information On, which indicates an opening time OTn at which the user terminal 2_n received an instruction to open the delivery notification mail MAn from the user Un.

In S34, the control unit 11 of the server 1 calculates a difference between the opening time indicated by the opening time information and the transmission time of the delivery notification mail and then calculates an engagement index on the basis of the calculated difference. Here, an engagement index is calculated for each of the packages to be delivered by the delivery vehicle 4. That is, the control unit 11 calculates an engagement index EN1 on the basis of a difference TD1 between the opening time OT1 and the transmission time ST1, an engagement index EN2 on the basis of a difference TD2 between the opening time OT2 and the transmission time ST2, . . . , and an engagement index ENn on the basis of a difference TDn between the opening time OTn and the transmission time STn. The calculated engagement index for each package is registered to a package database (not illustrated) and associated with an order number given to the package in advance. In the package database, in addition to the engagement indices, addresser information (e.g., a user identifier (ID), a name, an address, and a telephone number of an addresser) regarding all packages and addressee information (e.g., a user ID, a name, an address, and a telephone number of an addressee) regarding addressees of the packages are registered and associated with order numbers. With regard to a package for which a delivery vehicle 4 to be used has been determined, identification information regarding the delivery vehicle 4 is registered to the package database and associated with an order number of the package. With regard to a package for which a scheduled delivery date and a scheduled delivery time have been determined, the scheduled delivery date and the scheduled delivery time are registered to the package database.

The first phase thus ends. The second phase now starts. The second phase starts, for example, when a delivery vehicle 4 has left the delivery center.

In S35, the delivery terminal 3 transmits, using the communication unit 35, positional information indicating a current position thereof to the server 1. Here, after the delivery vehicle 4 leaves the delivery center, the delivery terminal 3 periodically transmits the positional information to the server 1.

In S36, the control unit 11 of the server 1 receives, using the communication unit 12, the positional information transmitted from the delivery terminal 3 to detect the current position of the delivery vehicle 4.

In S37, the control unit 11 of the server 1 extracts packages to be delivered by the delivery vehicle 4 whose destinations (positions of addressees) are located within a certain range from the current position of the delivery vehicle 4.

In S38, the control unit 11 of the server 1 sets order of delivery of the packages extracted in S37 in descending order of the engagement index.

In S39, the control unit 11 of the server 1 transmits delivery order information, which indicates the set order of delivery, to the delivery terminal 3 using the communication unit 12.

Figure 4:
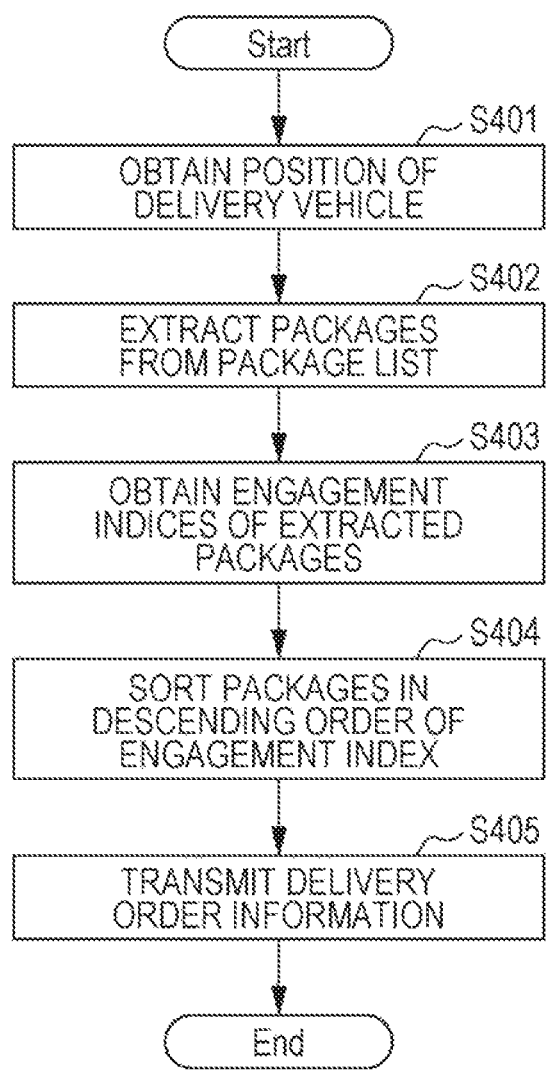
FIG. 4 is a flowchart illustrating an example of a process performed by a server to set order of delivery from engagement indices.

FIG. 4 is a flowchart illustrating an example of a process performed by the server 1 to set order of delivery from engagement indices. The flowchart corresponds to the second phase illustrated in FIG. 3. The flowchart, that is, the process illustrated in FIG. 4, starts, for example, when the server 1 has received, from the delivery terminal 3, departure information, which indicates that the delivery vehicle 4 has left the delivery center. Each time the server 1 has received positional information from the delivery terminal 3, the server 1 performs the process illustrated in FIG. 4.

The control unit 11 of the server 1 has created in advance a package list on which order numbers of packages to be delivered by a delivery vehicle 4 and the like are enumerated and stored the package list in the memory 13. The package list includes, in addition to the order numbers, addresser information (e.g., user IDs, names, addresses, telephone numbers of addressers) regarding the packages and addressee information (e.g., user IDs, names, addresses, and telephone numbers of addressees) regarding addressees of the packages. The server 1 transmits the package list to the delivery terminal 3 immediately before the delivery vehicle 4 leaves the delivery center, for example, and the driver of the delivery vehicle 4 can view the package list using the delivery terminal 3.

First, the control unit 11 of the server 1 obtains positional information indicating a current position of the delivery vehicle 4 from the delivery terminal 3 using the communication unit 12 (S401). Next, the control unit 11 of the server 1 extracts, from the package list, one or more packages corresponding to addresses of addressees located within a certain range from the current position of the delivery vehicle 4 (S402).

Next, the control unit 11 of the server 1 obtains engagement indices for the extracted packages (S403). Here, the control unit 11 of the server 1 may obtain the engagement indices for the extracted packages from the engagement indices for the packages calculated in S34 in the first phase illustrated in FIG. 3. Alternatively, in FIG. 3, S34, in which engagement indices are calculated, may be omitted, and engagement indices may be calculated in S403.

Next, the control unit 11 of the server 1 sets order of delivery of the packages extracted in S402 by sorting the packages in descending order of the engagement index (S404). Next, the control unit 11 of the server 1 transmits delivery order information indicating the order of delivery to the delivery terminal 3 (S405).

Although the server 1 performs the process illustrated in FIG. 4 each time the server 1 has obtained positional information from the delivery vehicle 4 in the above description, the present disclosure is not limited to this. The server 1 may perform the process illustrated in FIG. 4 each time the delivery vehicle 4 has moved a certain distance, delivered a package, or gone out of a currently set certain range D1, which will be described hereinafter with reference to FIG. 5.

Figure 5:
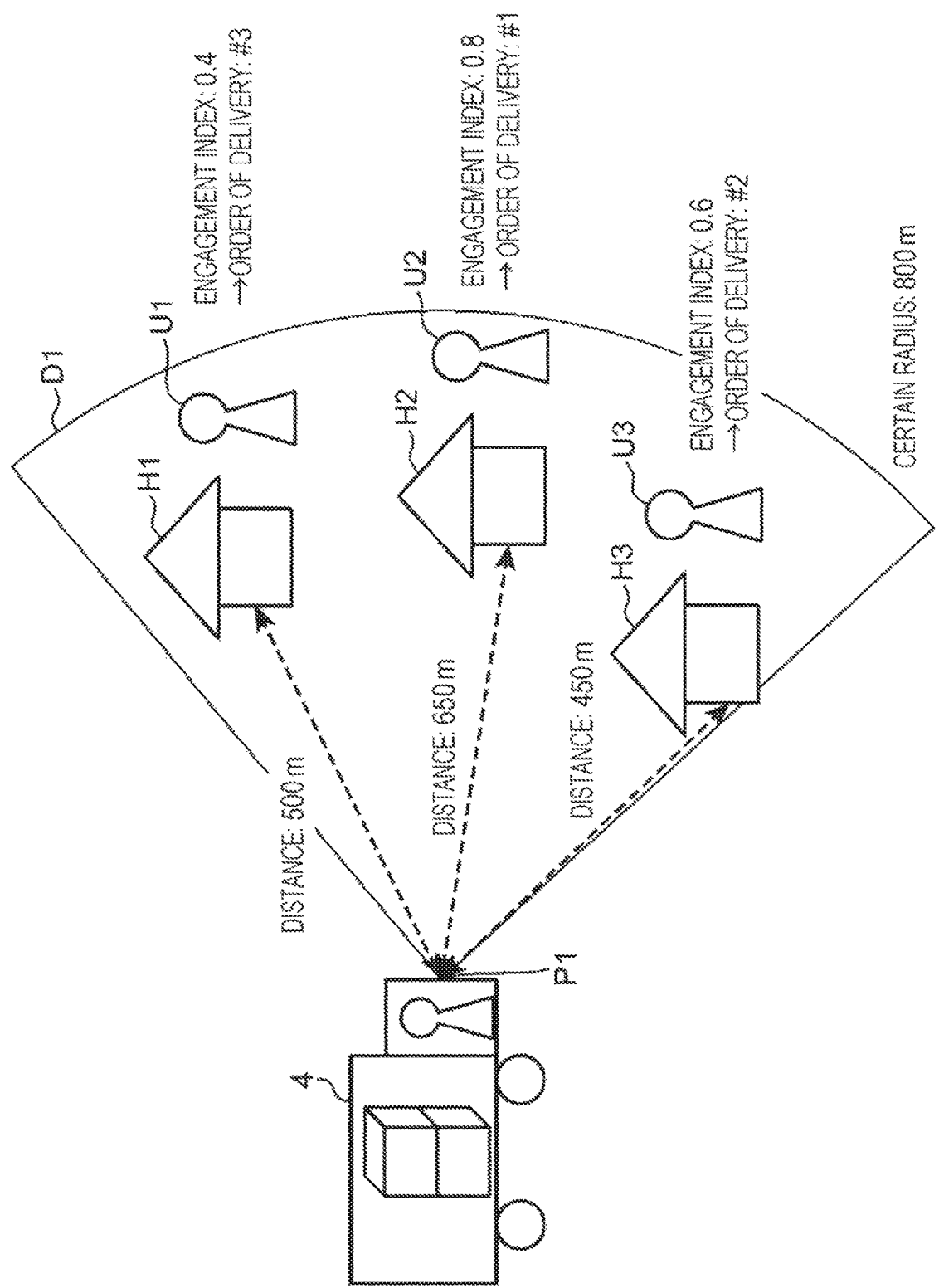
FIG. 5 is a diagram illustrating a specific scene of the process illustrated in FIG. 4.

FIG. 5 is a diagram illustrating a specific scene of the process illustrated in FIG. 4. The server 1 has obtained, from the delivery terminal 3, positional information indicating that the current position of the moving delivery vehicle 4 is a position P1. In this case, the control unit 11 of the server 1 sets, as the certain range D1, a circle having a certain radius around the position P1 as a center. Although the certain radius is assumed to be about 800 m here, this is just an example. A radius of 50 m, 100 m, or 1 km may be used, instead. Although the certain range D1 is indicated by a fan-shaped figure in FIG. 5 for the sake of convenience, the certain range D1 is actually a circle.

Next, the control unit 11 of the server 1 extracts, from the package list, packages corresponding to addresses of addressees located within the certain range D1. Here, a house H1 of the user U1, who is an addressee, is located 500 m away from the position P1. A house H2 of the user U2, who an addressee, is located 650 m away from the position P1. A house H3 of the user U3, who is an addressee, is located 450 m away from the position P1. Packages for the users U1 to U3, therefore, are extracted from the package list.

It is assumed here that engagement indices for the extracted packages for the users U1 to U3 are 0.4, 0.8, and 0.6, respectively. The control unit 11 of the server 1, therefore, sets the package for the user U2 whose engagement index is the highest, namely 0.8, as a first, the package for the user U3 whose engagement index is the second highest, namely 0.6, as a second, and the package for the user U1 whose engagement index is 0.4 as a third in the order of delivery. The control unit 11 then transmits delivery order information to the delivery terminal 3. The driver of the delivery vehicle 4 checks the order of delivery indicated by the transmitted delivery order information using the delivery terminal 3 and delivers the packages in the order of delivery.

Figure 6:
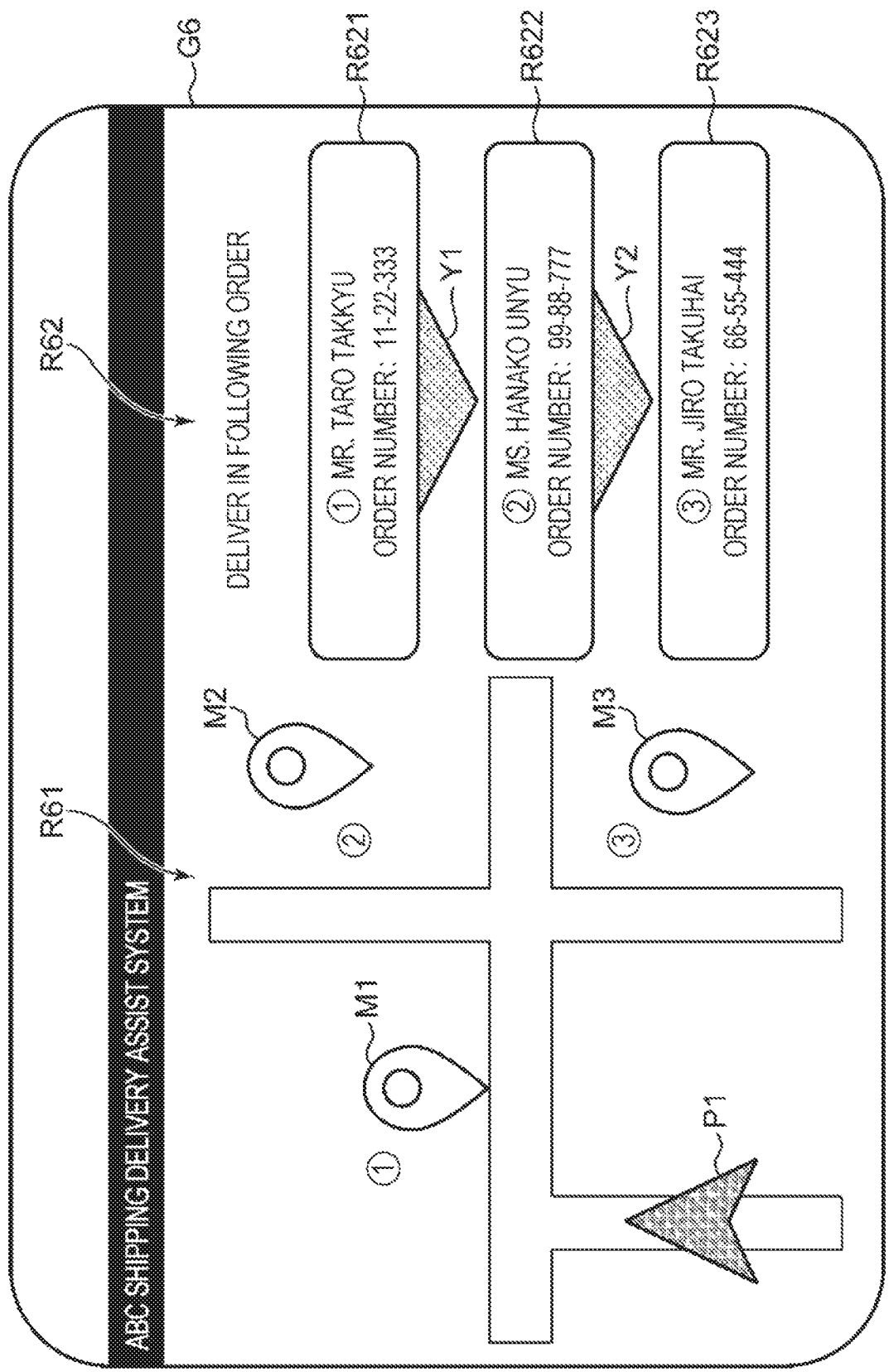
FIG. 6 is a diagram illustrating an example of a delivery order screen indicating order of delivery displayed on a delivery terminal.

FIG. 6 is a diagram illustrating an example of a delivery order screen G6 indicating order of delivery displayed on the delivery terminal 3. The delivery order screen G6 indicates order of delivery of packages located within the certain range D1 extracted from the package list. The delivery order screen G6 includes a map part R61 and an order part R62. In the map part R61, a map image within a certain range including the position P1 of the delivery vehicle 4 is displayed, and destinations of packages to be delivered are indicated in the map image using marks M1, M2, and M3. Here, the packages are to be delivered in order of the marks M1, M2, and M3, and numbers "1", "2", and "3" indicating the order of delivery are displayed near the marks M1, M2, and M3, respectively.

In the order part R62, a message, "Deliver in this order", is displayed. Package fields R621, R622, and R623 corresponding to the packages whose order of delivery is "1", "2", and "3" are displayed under the message from the top in this order. In the package field R621, the number "1" indicating the order of delivery, a name, "Taro Takkyu", of a user who is an addressee, and an order number of the package "11-22-333" are displayed. The same types of content as in the package field R621 are also displayed in the other package fields R622 and R623. The package fields R621, R622, and R623 are connected to each other by downward arrows Y1 and Y2.

Since the package fields R621 to R623 are displayed in the order part R62 in the order of delivery, the driver can promptly understand the order of delivery. In addition, since the marks M1 to M3 indicate the destinations of the packages in the map image in the map part R61, the driver can promptly determine a delivery path on the basis of the destinations of the packages. In addition, since the marks M1 to M3 are associated with the package fields R621 to R623 using the numbers "1" to "3", respectively, which indicate the order of delivery, the driver can promptly understand the addressees and the destinations of the packages.

Next, a method for calculating an engagement index will be described. In the present disclosure, an engagement index is calculated using one of the following four methods.

First Method for Calculating Engagement Index

As illustrated in FIG. 3, a first calculation method is a method for calculating an engagement index on the basis of a difference between a transmission time and an opening time of a delivery notification mail. The delivery notification mail is an example of delivery notification information. The opening time is an example of a viewing time.

Figure 7:
FIG. 7 is a diagram illustrating an example of a mail screen of a delivery notification mail.

FIG. 7 is a diagram illustrating an example of a mail screen G7 of a delivery notification mail. The mail screen G7 is a screen of a delivery notification mail transmitted to and displayed on the user terminal 2 when a shipping company "ABC shipping" has received an order from a user "Taro Takkyu". The mail screen G7 includes a header part R71 and a body part R72. The header part R71 includes a sender of the delivery notification mail "ABC shipping", a destination of the delivery notification mail "Mr. Taro Takkyu", a mail address, a subject "Received your package", and a time of transmission of the delivery notification mail "Oct. 16, 2017 15:36".

In the body part R72, a message, "We have received your package", which indicates that the shipping company has received the package for the user, a message indicating a scheduled delivery time, "Your package will arrive in 18:00 to 20:00 tomorrow, Oct. 17, 2017", an order number of the package "11-22-333", an addresser of the package "Pana-.com", and details of the package "Four kitchen rolls" are displayed.

The delivery notification mail need not be transmitted to the user terminal 2 before the delivery vehicle 4 leaves the delivery center, but may be transmitted to the user terminal 2 after the delivery vehicle 4 leaves the delivery center. The body part R72 of the delivery notification mail transmitted to the user terminal 2 after the delivery vehicle 4 leaves the delivery center may include a current position of the package or information indicating a delivery condition of the package. The current position of the package may be determined on the basis of positional information detected by the GPS sensor 37 of the delivery vehicle 4. The delivery condition of the package may be a condition in which the package has been loaded into the delivery vehicle 4, a condition in which the delivery vehicle 4 into which the package has been loaded has left the delivery center, a condition in which a previous package has been delivered, or the like.

Since the delivery notification mail includes information indicating a scheduled delivery date, a type of package to be delivered, and the like, a user whose degree of interest in the package is high will promptly open the delivery notification mail.

FIG. 8 is a diagram illustrating an example of an opening history table T1 indicating the user's opening history of delivery notification mails. The opening history table T1 is stored in the memory 13 of the server 1.

The opening history table T1 is a database in which each act of opening of a delivery notification mail is registered as a record. The opening history table T1 includes fields of "user ID", "order number", "mail transmission time", and "mail opening time".

In the "user ID" field, a user ID (identification information) of a user (an addressee of a package) of a user terminal 2 that has received a delivery notification mail corresponding to the package is registered. In the "order number" field, an order number of a package corresponding to a delivery notification mail is registered. In the "mail transmission time" field, a time at which the server 1 has transmitted a delivery notification mail to the user terminal 2 is registered. In the "mail opening time" field, a time at which the user has opened a delivery notification mail using the user terminal 2 is registered.

The control unit 11 of the server 1 calculates an engagement index on the basis of a difference between a mail transmission time and a mail opening time registered in the opening history table T1.

Here, the server 1 may calculate an engagement index using expression (1).

$$\frac{1}{N}\sum_{i}\left(\frac{1}{2}\right)^{t_i/T} \tag{1}$$

In expression (1), N denotes the total number of delivery notification mails transmitted for a certain package, ti denotes a difference between a transmission time and an opening time of an i-th delivery notification mail for the certain package, that is, ti={(opening time of i-th delivery notification mail for certain package)−(transmission time of i-th delivery notification mail for certain package)}, and T denotes a half-life. Because the half-life T is a constant, T is, for example, 6 (hours)×60 (minutes)×60 (seconds)=21,600. Because ti is an exponent of (½) in expression (1), the engagement index increases as ti decreases, that is, as the user has opened a delivery notification mail at an earlier time point.

Because ti is infinite when the user has not opened a delivery notification mail, the following expression (4) holds true.

$$\left(\frac{1}{2}\right)^{t_i/T} \to 0$$

Since the user whose degree of interest in a package is high is eagerly waiting for arrival of the package, it is assumed that the user's degree of interest in a delivery notification mail is also high and it is likely that the user is frequently checking whether the user has received a delivery notification mail. It is therefore assumed that the user whose degree of interest in the package is high will promptly open a delivery notification mail as soon as the user terminal 2 has received the delivery notification mail. The difference, therefore, serves as a useful index in guessing the user's degree of interest in the package. For this reason, the engagement index is calculated on the basis of the difference in the first calculation method. Here, the server 1 may directly employ the difference as the engagement index instead of using expression (1). Alternatively, the server 1 may calculate, as the engagement index, a value obtained by normalizing the difference such that a maximum value of the engagement index becomes 1.

Although a delivery notification mail is used as delivery notification information in this example, this is just an example. A message transmitted on a social networking service (SNS) may be used as delivery notification information, instead. In this case, the engagement index may be calculated on the basis of a difference between a viewing time at which the user has viewed the message transmitted on the SNS and a transmission time of the message transmitted on the SNS.

Second Method for Calculating Engagement Index

In a second calculation method, an engagement index is calculated on the basis of an opening ratio of delivery notification mails. After the user purchases a product on a shopping website, mails such as a receipt mail for confirming the purchase of the product, an order completion mail for notifying the user of completion of assignment of delivery to a shipping company, and a mail for notifying the user that a delivery vehicle 4 has left a delivery center to deliver the product to the user are generally transmitted to the user terminal 2.

A user who is greatly interested in a package tends to frequently check whether the user has received a delivery notification mail. The user also tends to open delivery notification mails transmitted for the package. In the second calculation method, therefore, mails transmitted after a user purchases a product are determined as delivery notification mails, and an engagement index is calculated on the basis of an opening ratio of the delivery notification mails.

The opening history table T1 illustrated in FIG. 8 includes three delivery notification mails transmitted to the user terminal 2 for a package, which is a product purchased by a user whose user ID is "U001234" and whose order number is "11-22-333". Here, opening times of first two delivery notification mails are registered in the "mail opening time" field of the delivery notification mails, which means that the user has opened these two delivery notification mails. In a third delivery notification mail, on the other hand, "N/A" is registered in the "mail opening time" field, which means that the user has not opened the third delivery notification mail.

An opening ratio of the package whose order number is "11-22-333" in this case is therefore ⅔=0.66. That is, the opening ratio is defined by a value obtained by dividing the number of delivery notification mails opened by the total number of delivery notification mails transmitted for a package.

In this example, a delivery notification mail is an example of delivery notification information, and an opening ratio of delivery notification mails is an example of a viewing ratio of delivery notification information. The present disclosure, however, is not limited to this, and delivery notification information may be a message transmitted on an SNS. In this case, an engagement index may be calculated on the basis of the number of times of viewing, by the user, of messages transmitted on an SNS and the total number of messages transmitted on the SNS.

Third Method for Calculating Engagement Index

These days, shipping companies provide delivery condition notification services based on application software (hereinafter referred to as "delivery condition apps") for notifying users of delivery conditions of packages for the users. In a third calculation method, an engagement index is calculated on the basis of the user's viewing history of a delivery condition app.

Figure 9:
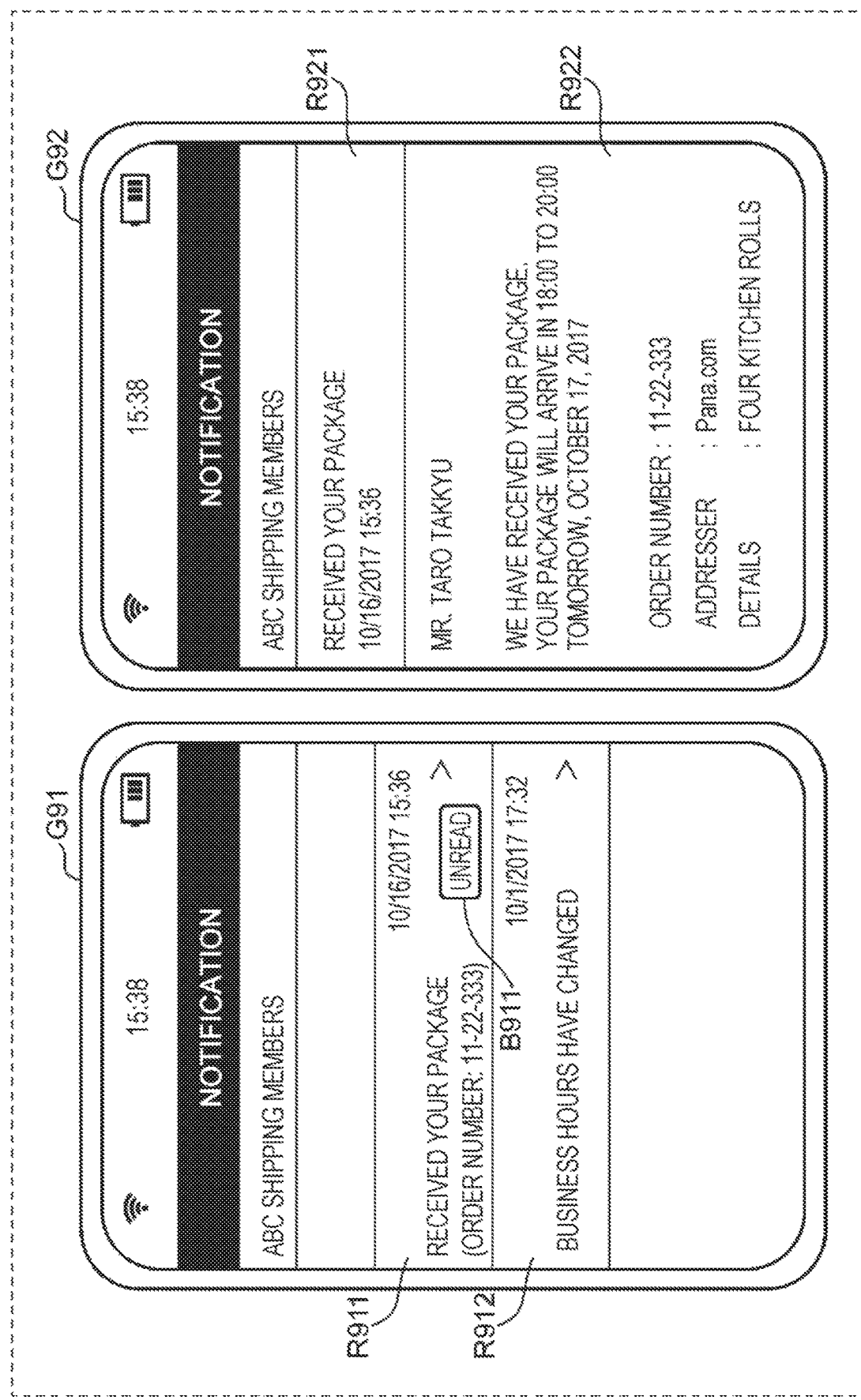
FIG. 9 is a diagram illustrating a notification screen of a delivery condition app.

FIG. 9 is a diagram illustrating notification screens G91 and G92 of the delivery condition app. The notification screen G91 is displayed, for example, when the user has activated the delivery condition app on the user terminal 2. The notification screen G91 includes, as a list, outlines of messages transmitted to the user from the delivery condition notification service. Here, two message display fields R911 and R912 are displayed. An outline of a message displayed in the message display field R911 includes a subject, "We have received your package", of the message indicating that a shipping company has received a package of a product purchased by the user, a transmission time, "Oct. 16, 2017 15:36", of the message, and an order number, "11-22-333", of the package. An outline of a message displayed in the message display field R912 includes a subject of a message about business hours of the shipping company.

Because the user has not opened the message corresponding to the outline, an "unread" button B911 is displayed in the message display field R911. If the user selects the "unread" button B911, the user terminal 2 displays the notification screen G92 for notifying the user of content of the message.

The notification screen G92 includes a header field R921 and a body field R922. In the header field R921, a subject and a transmission time of a message are displayed. In the body field R922, a user name "Taro Takkyu", a message indicating that the shipping company has received the package for the user, "We have received your package", and a message indicating a scheduled delivery time, "Your package will arrive from 18:00 to 20:00 tomorrow, on Oct. 17, 2017" are displayed. In the body field R922, the order number of the package "11-22-333", the addresser of the package "Pana.com", and the details of the package "Four kitchen rolls" are displayed.

Figure 10:
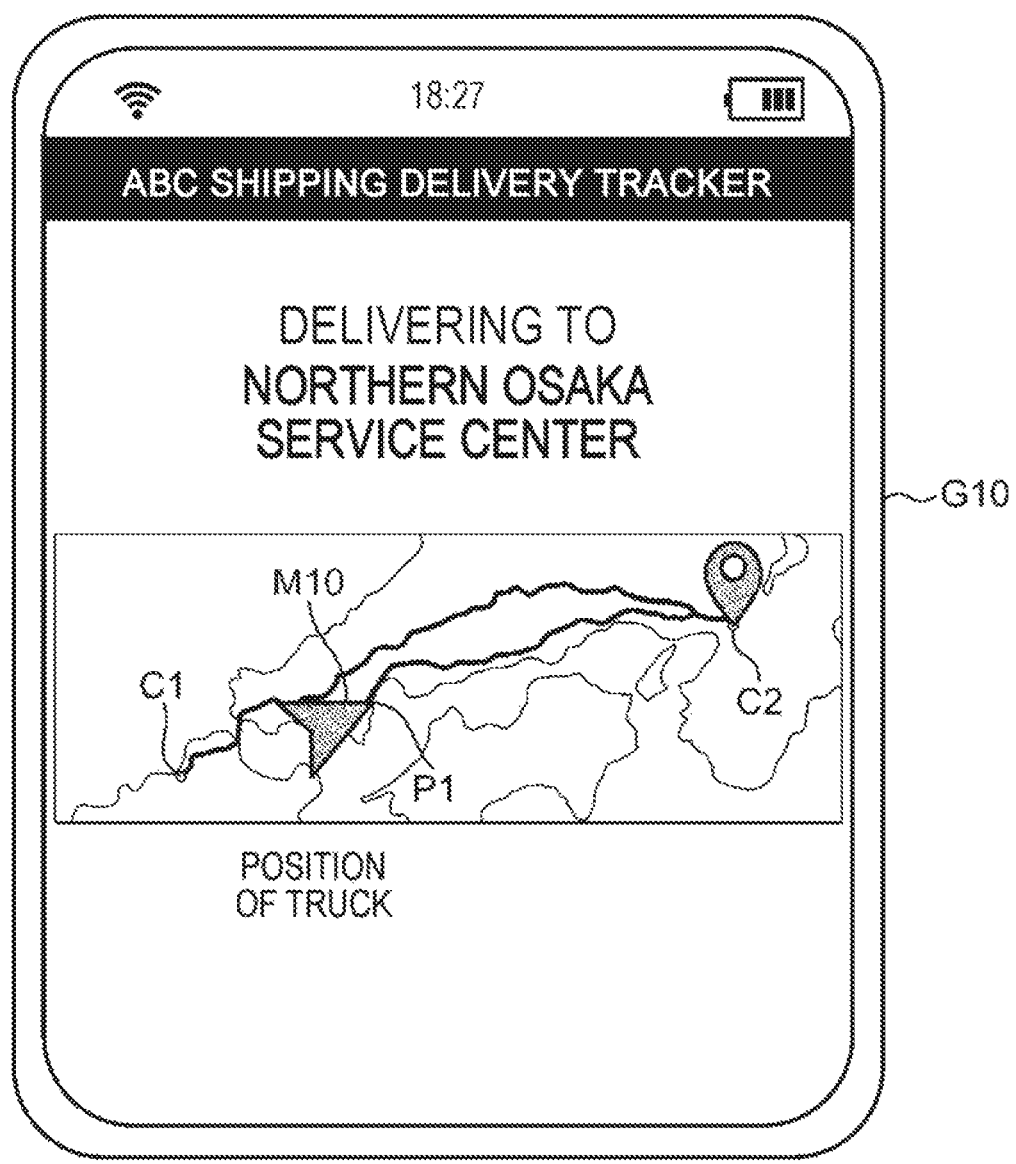
FIG. 10 is a diagram illustrating an example of a delivery tracker screen provided by the delivery condition app.

FIG. 10 is a diagram illustrating an example of a delivery tracker screen G10 provided by the delivery condition app. The delivery tracker screen G10 is used to notify the user of a current position of a package that is being delivered. In the delivery tracker screen G10, a current position P1 of a package that is being delivered is displayed in a map image. Here, a scene in which a package is delivered to a user who lives in Northern Osaka from Fukuoka is indicated. The package is delivered by a long-distance delivery vehicle 4 from a delivery center C1 in Fukuoka to another delivery center C2 in Northern Osaka and then delivered to the user's house in Northern Osaka by a local delivery vehicle 4. Since the long-distance delivery vehicle 4 is currently located at the position P1 on an expressway closer to Hiroshima than to Fukuoka, a mark M10 indicating a location of the package is displayed at the position P1 in a map image of a Western part of Japan. In the delivery tracker screen G10, the current position of the package that is being delivered by the long-distance delivery vehicle 4 is displayed in real-time. The user can select the delivery tracker screen G10 from, for example, a menu screen (not illustrated) of the delivery condition app.

Figure 11:
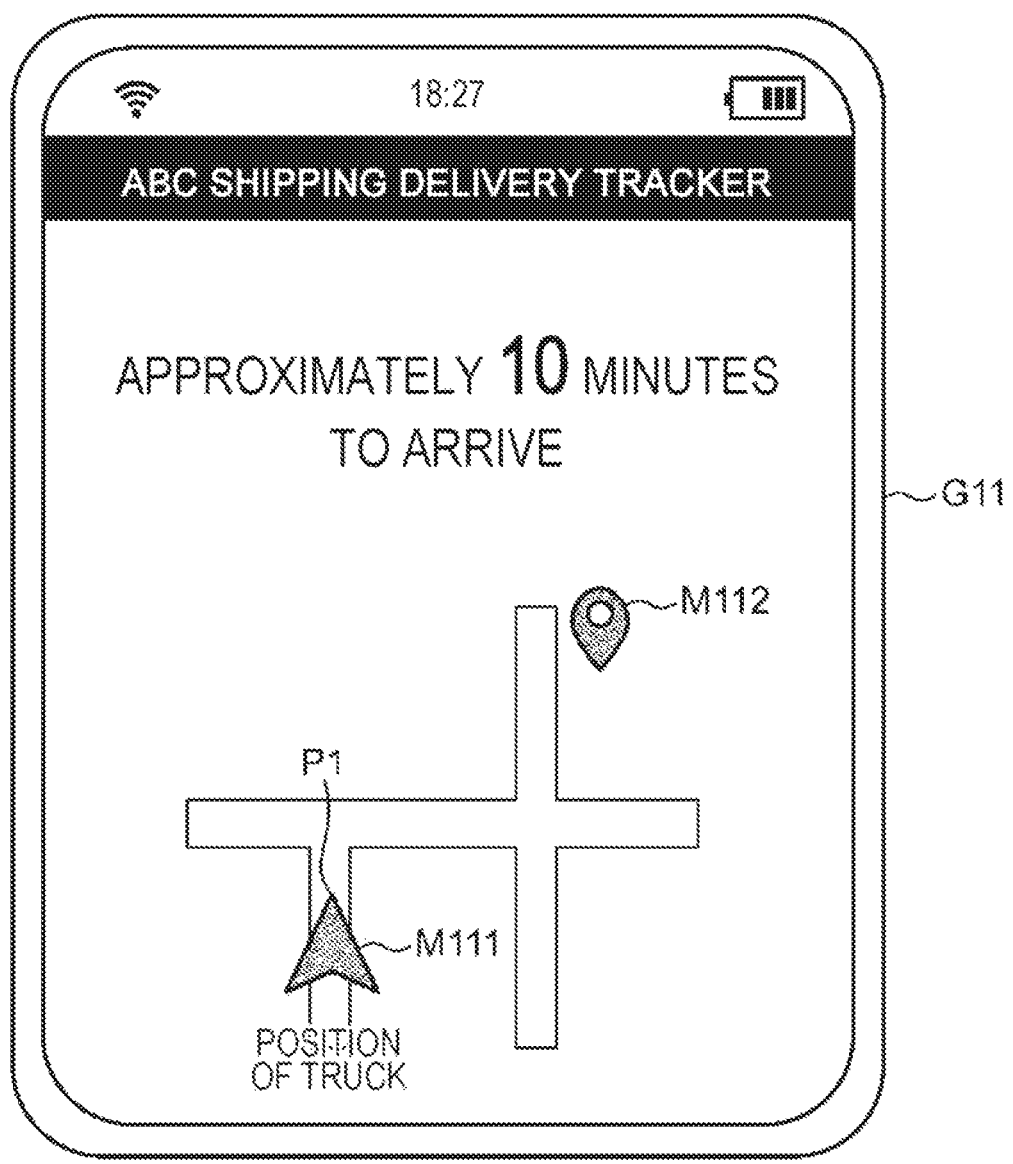
FIG. 11 is a diagram illustrating another example of the delivery tracker screen provided by the delivery condition app.

FIG. 11 is a diagram illustrating an example of a delivery tracker screen G11 provided by the delivery condition app. Here, a scene in which the local delivery vehicle 4 that has left the delivery center C2 in Northern Osaka is delivering the package to the user's house is indicated. In the delivery tracker screen G11, a mark M111 indicating the current position P1 of the delivery vehicle 4 and a mark M112 indicating a position of the user's house are displayed in a map image of an area around the user's house. A message indicating time taken to deliver the package to the user's house, "Approximately 10 minutes to arrive", is also displayed in the delivery tracker screen G11. A current position of a package that is being delivered by a local delivery vehicle 4 is thus displayed in the delivery tracker screen G11 in real-time.

Since a current position of a package is displayed in the delivery tracker screens G10 and G11 in real-time, it can be assumed that a user who is eagerly waiting for arrival of the package will view the delivery tracker screens G10 and G11 for a long period of time.

In the third calculation method, therefore, an engagement index is calculated on the basis of time (visit duration) for which the delivery condition app is viewed.

FIG. 12 is a diagram illustrating an example of an opening history table T2 indicating the user's opening history of messages on the delivery condition app and a visit history table T3 indicating the users visit history on the delivery condition app. Here, the server 1 creates the opening history table T2 and the visit history table T3 on the basis of a viewing history of the delivery condition app sequentially transmitted from the user terminal 2. The viewing history transmitted from the user terminal 2 includes opening times of messages and viewing start times and viewing end times of screens provided by the delivery condition app.

The opening history table T2 and the visit history table T3 are stored in the memory 13 of the server 1.

The opening history table T2 is a database in which each act of opening of a message is registered as a record. The opening history table T2 includes fields of "user ID", "order number", "notification transmission time", and "notification opening time". In the "user ID" field, a user ID of a user (an addressee of a package) of a user terminal 2 that has received a message corresponding to the package is registered. In the "order number" field, an order number of a package corresponding to a message is registered. In the "notification transmission time" field, a time at which the user terminal 2 has received a message is registered. In the "notification opening time" field, a time at which the user has opened a message is registered. The time at which the user has opened a message is a time at which the user has selected the "unread" button B911. "N/A", which indicates that a message has not been read, is registered in the "notification opening time" field of a message that has not been read by the user.

The visit history table T3 is a database in which each screen of the delivery condition app viewed by the user is assigned to a record. The visit history table T3 includes fields of "user ID", "screen type", "visit time", "leaving time", and "order number".

In the visit history table T3, one record is created each time the user views a screen of the delivery condition app. When the user has viewed the same screen several times, one record is created for each viewing.

A type of screen of the delivery condition app is registered in the "user ID" field. The type of screen may be "notification", which indicates the notification screen G91 or G92 illustrated in FIG. 9, "delivery tracker", which indicates the delivery tracker screen G10 or G11 illustrated in FIG. 10 or 11, or the like. A time at which the user has visited a corresponding screen, that is, a time at which the user has displayed a corresponding screen on the user terminal 2, is registered in the "visit time" field. A time at which the user has left a corresponding screen is registered in the "leaving time" field. The time at which the user has left a corresponding screen is, for example, a time at which the user has performed an operation for switching to another screen or an operation for ending the delivery condition app.

The control unit 11 of the server 1 refers to the opening history table T2 and the visit history table T3 and calculates an engagement index using expression (2).

$$\alpha \frac{1}{N} \sum_i \left(\frac{1}{2}\right)^{t_i/T} + \beta \min\left(\frac{1}{C}\sqrt{\tau}, 1\right) \qquad (2)$$

In expression (2), N denotes the total number of messages transmitted for a certain package, ti denotes a difference between an opening time and a leaving time of an i-th message for the certain package, that is, ti={(leaving time of i-th message for certain package)−(opening time of i-th message for certain package)}, and T denotes a half-life. Because the half-life T is a constant, T is, for example, 6 (hours)×60 (minutes)×60 (seconds)=21,600. If the user has not read a message, ti becomes infinite as in expression (1). Alternatively, ti={(leaving time of i-th message for certain package)−(opening time of i-th message for certain package)} may be ti={(time at which user has left screen of outline of i-th message for certain package)−(time at which user has visited screen of outline of i-th message for certain package)}, instead.

In a second term, τ denotes total time for which the delivery condition app has remained activated in order to check a delivery condition of the certain package, and C denotes a constant for rounding down √τ to a value slightly exceeding 0 to 1. A root is added to τ in order to round down τ to a value slightly exceeding 0 to 1. In addition, min in the second term is an operator for selecting (1/C)·√τ or 1, whichever is smaller. Coefficients α and β satisfy 0<α<1, 0<β<1, and α+β=1. An engagement index is therefore normalized to a value equal to or larger than 0 but equal to or smaller than 1.

In expression (2), therefore, the engagement index increases as ti decreases, and decreases as τ increases.

When time taken by the user to open a message after the user receives the message is emphasized, that is, when a first term is emphasized, the coefficient α is set larger than the coefficient β. When the user's visit duration for the delivery condition app is emphasized, that is, when the second term is emphasized, on the other hand, the coefficient β is set larger than the coefficient α.

Although the engagement index is calculated using expression (2) in the third calculation method, this is just an example. Any expression may be employed, instead, insofar as the engagement index is negatively correlated with ti and positively correlated with τ. Although the first term is provided for expression (2) in order to take into consideration time taken by the user to check a message, the first term may be omitted, instead. In this case, the engagement index is calculated while taking into consideration the user's visit duration for the delivery condition app.

The control unit 11 of the server 1 may refer to the opening history table T2 and calculate a difference between a notification transmission time and a notification check time as ti in expression (2) for each message transmitted for a certain package. The server 1 may extract records of a certain package for a target user, calculate a difference between a visit time and a leaving time for each record, and calculate the sum of the differences as τ in expression (2).

Since records of the notification screens and the delivery tracker screens are registered as screen types of the user whose user ID is "U001234" in the example illustrated in FIG. 12, the sum of differences between visit times and leaving times of the records of the notification screens and differences between visit times and leaving times of the records of the delivery tracker screens is calculated as r in expression (2). A weight may be provided for each screen type. When a weight for the notification screens is $\beta 1$ and a weight for the delivery tracker screens is $\beta 2$, for example, the second term of expression (2) may be calculated by adding up a value of $\min(1/c\sqrt{\tau}, 1)$ whose coefficient is $\beta 1$ and a value of $\min(1/c\sqrt{\tau}, 1)$ whose coefficient is $\beta 2$. Here, however, $\beta 1+\beta 2=\beta$.

Since a user who is greatly interested in a package is eagerly waiting for arrival of the package, it can be expected that the user will frequently activate the delivery condition app and promptly open messages relating to the package by opening the notification screens. It can also be expected that a user who is greatly interested in a package will view the delivery tracker screens for a longer time in order to track a current position of a package after the package leaves a delivery center.

Since the engagement index for a package becomes high when a user has promptly opened, using the delivery condition app, messages corresponding to the package transmitted to the user and the user's visit duration for the delivery condition app is long in the third calculation method, an engagement index that accurately reflects the user's interest in a package can be calculated.

Figure 13:
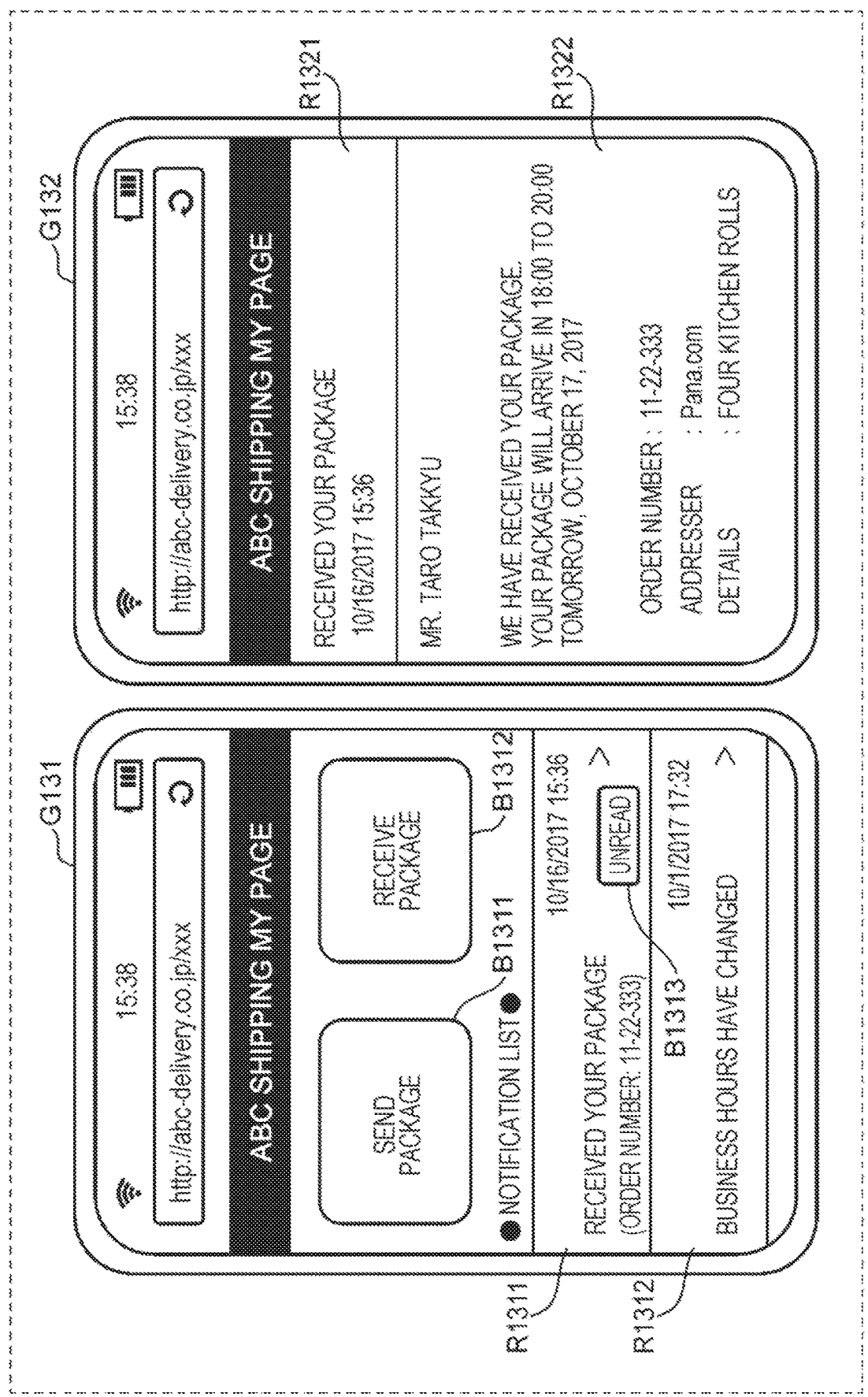
FIG. 13 is a diagram illustrating an example of notification screens of a website that provides a delivery condition notification service.

A delivery condition notification service may be provided by a website, instead of a delivery condition app. FIG. 13 is a diagram illustrating an example of notification screens G131 and G132 of a website that provides the delivery condition notification service. The notification screen G131 is displayed when a certain authentication process based on a user ID and a password has been performed and access has been permitted after the user accesses a home page of the website. Items included in the notification screen G131 are essentially the same as those included in the notification screen G91.

That is, the notification screen G131 includes a part "notification list", in which outlines of messages are displayed as a list. The part includes message display fields R1311 and R1312. Items included in the message display fields R1311 and R1312 are the same as those included in the message display fields R911 and R912 of the notification screen G91.

In the notification screen G131, however, a button B1311, "send package", and a button B1312, "receive package", are provided above the part "notification list". The button B1311 is selected by a user who desires to send a package. If the user selects the button B1311, a request form for requesting shipping of a package is displayed, and the user can request shipping of a package by inputting necessary information to the request form. The button B1312 is selected by a user who desires to receive a package. The button B1312 is selected, for example, when a user who was absent and did not receive a package desires to receive the package.

If the user selects an "unread" button B1313 displayed in the message display field R1311, the notification screen G132 is displayed on the user terminal 2. Items included in the notification screen G132 are essentially the same as those included in the notification screen G92.

The notification screen G132 includes a header part R1321 and a body part R1322. Items included in the header part R1321 and the body part R1322 are essentially the same as those included in the header part R921 and the body part R922.

Although not illustrated, the delivery tracker screens G10 and G11 may also be displayed on the website.

FIG. 14 is a diagram illustrating an example of a web visit history table T4 used when a mode in which a website provides a delivery condition notification service is employed.

The web visit history table T4 is stored in the memory 13 of the server 1. Here, when a web server that presents the website is different from the server 1, the server 1 may communicate with the web server and obtain various types of data to be registered to the web visit history table T4.

The web visit history table T4 is a database in which each screen of the website viewed by the user is assigned to a record and includes fields of "user ID", "site type", "visit time", "leaving time", and "order number". The data structure of the web visit history table T4 is essentially the same as the visit history table T3 except that "screen type" is replaced by "site type", and detailed description thereof is omitted. In the example illustrated in FIG. 14, data is not registered in the field of "order number" in a record of a first screen of "my page". This is because the first screen of "my page" is not a screen for notifying the user of information regarding individual packages but a screen for notifying the user of information regarding the delivery condition notification service in general.

When the web visit history table T4 is used, the server 1 may calculate an engagement index using expression (3).

$$\min\left(\frac{1}{C}\sqrt{\tau}, 1\right) \tag{3}$$

Here, expression (3) is the same as the second term of expression (2) except that the coefficient β is omitted, and detailed description thereof is omitted. The server 1 may calculate the engagement index by substituting a difference between a visit time and a leaving time on the web visit history table T4 for τ in expression (3).

Fourth Method for Calculating Engagement Index

A fourth method for calculating an engagement index is a method for which an engagement index for a currently delivered package (hereinafter referred to as a "target package") on the basis of a delivery history of packages delivered to the user in the past and calculating a final engagement index for the target package on the basis of the estimated engagement index.

FIG. 15 is a diagram illustrating an example of the data structure of a delivery history table T5 and an example of the data structure of a package table T6 in which information regarding a target package is registered.

The delivery history table T5 is stored in the memory 13 of the server 1. The package table T6 is generated by the server 1 on the basis of data transmitted from the user terminal 2 to the server 1 when the user has purchased a product on a shopping website. Alternatively, when the server 1 is different from a server for managing the shopping website, the package table T6 is generated by the server 1 on the basis of data transmitted from the server for managing the shopping website as a request to deliver the product purchased by the user.

The delivery history table T5 is a database in which delivery of each product is registered as a record. The delivery history table T5 includes fields of "order number", "addresser", "item", "outer dimensions/weight", and "engagement index".

"Order number" is the same as "order number" illustrated in FIG. 8 and other drawings. In the "addresser" field, a name of an addresser of a corresponding package is registered. In the "item" field, details of an item in a corresponding package are registered. The details of an item include information regarding a type of item, an item name, and the number of items. In the "outer dimensions/weight" field, dimensions and weight of a corresponding package are registered. The dimensions of a package may be, for example, height, width, and depth of a box containing a product. In the "engagement index" field, a final engagement index calculated for a corresponding package is registered.

The data structure of the package table T6 is the same as that of the delivery history table T5, and detailed description thereof is omitted. Here, the server 1 calculates a final engagement index for a target package from various types of data registered in the delivery history table T5 and registers the final engagement index to the "engagement index" field of the package table T6.

Data of "addresser", "item", and "outer dimensions/weight" in the delivery history table T5 and the package table T6 will be generically referred to as "attribute information", which indicates attributes of packages, hereinafter.

Details of the calculation of a final engagement index are as follows. First, the server 1 calculates a current engagement index for a target package. Here, the server 1 may calculate the current engagement index using one of the above-described first to third calculation methods.

Next, the server 1 extracts, from the delivery history table T5, one or more records of delivery corresponding to a user for which the target package is to be delivered. The server 1 then calculates feature values (hereinafter referred to as "record feature values") of attribute information regarding the extracted records and a feature value (hereinafter referred to as a "target feature value") of attribute information regarding the target package. Lastly, the server 1 calculates an estimated engagement index for the target package on the basis of levels of similarity between the record feature values and the target feature value.

Here, the estimated engagement index is based on a notion that the user's interest in the target package tends to be similar to the user's interest in similar packages delivered in the past. The server 1 may therefore calculate levels of similarity between the target feature value and the record feature values, set weighting coefficients for the records of delivery such that records whose levels of similarity are high are given high weighting coefficients, and perform weight averaging on engagement indices for the records of delivery using the set weighting coefficients, in order to calculate the estimated engagement index for the target package.

The estimated engagement index can be represented by, for example, expression (4).

$$\text{Estimated engagement index} = (1/N) \cdot \Sigma(\gamma i \cdot Ei) \quad (4)$$

In expression (4), N denotes the total number of records of delivery of a corresponding user, $\gamma i$ denotes a weighting coefficient of an engagement index for an i-th record, and $Ei$ denotes the engagement index for the i-th record. For example, a level of similarity between the target feature value and an i-th record feature value is calculated as follows. Because "addresser" and "item" are text information, for example, levels of text similarity are used as levels of similarity of "addresser" and "item". In addition, because "outer dimensions/weight" is expressed by a vector composed of four components of height, width, depth, and weight, a level of vector similarity is used as a level of similarity of "outer dimensions/weight". The server 1 may calculate the sum of the level of text similarity of "addresser", the level of text similarity of "item", and the level of vector similarity of "outer dimensions/weight" as a level of similarity between the target feature value and the i-th record feature value. The server 1 may then calculate the weighting coefficient $\gamma i$ by normalizing the level of similarity between the target feature value and the i-th record feature value such that the level of similarity falls within a range of 0 to 1.

As the level of text similarity, a distance such as the Levenshtein distance or the Jaro-Winkler distance may be used. As the level of vector similarity, a distance such as the Euclidean distance or the cosine distance may be used. Alternatively, the level of text similarity may be calculated using a level of vector similarity, which is obtained by conducting a morphological analysis on text information and converting words obtained as a result of the morphological analysis into vectors using a word vector conversion method typified by Word2vec.

After calculating the estimated engagement index in this manner, the server 1 calculates a final engagement index for the target package using expression (5).

$$\text{Final engagement index} = \alpha \times \text{Estimated engagement index} + \beta \times \text{Current engagement index} \quad (5)$$

In expression (5), coefficients $\alpha$ and $\beta$ satisfy $0 < \alpha < 1$, $0 < \beta < 1$, and $\alpha + \beta = 1$.

Since an engagement index for a target package is calculated while taking into consideration engagement indices for packages delivered to a user in the past, the fourth calculation method can be used to calculate an engagement index that accurately reflects the user's interest in a package.

Although a final engagement index is registered in the "engagement index" field of the delivery history table T5 in the above description, the present disclosure is not limited to this. An estimated engagement index or a current engagement index (an engagement index calculated using one of the first to third calculation methods) may be registered, instead. In this case, the estimated engagement index is calculated by substituting an engagement index registered in the delivery history table T5 (an estimated engagement index or a current engagement index) for $Ei$ in expression (4).

Determination of Order of Storage in Package Lockers

In apartment houses, package lockers for temporarily storing packages delivered to persons who did not receive the packages are provided. Since such package lockers have a limited capacity, it might be difficult for the package lockers to store all packages that were delivered by the delivery vehicle 4 but not received by addressees, depending on a storage condition of the package lockers. In the present disclosure, therefore, when it is difficult for package lockers to store all packages, order of storage of the packages is determined in descending order of the engagement index, and the packages are stored in the package lockers in the order of storage.

Figure 16:
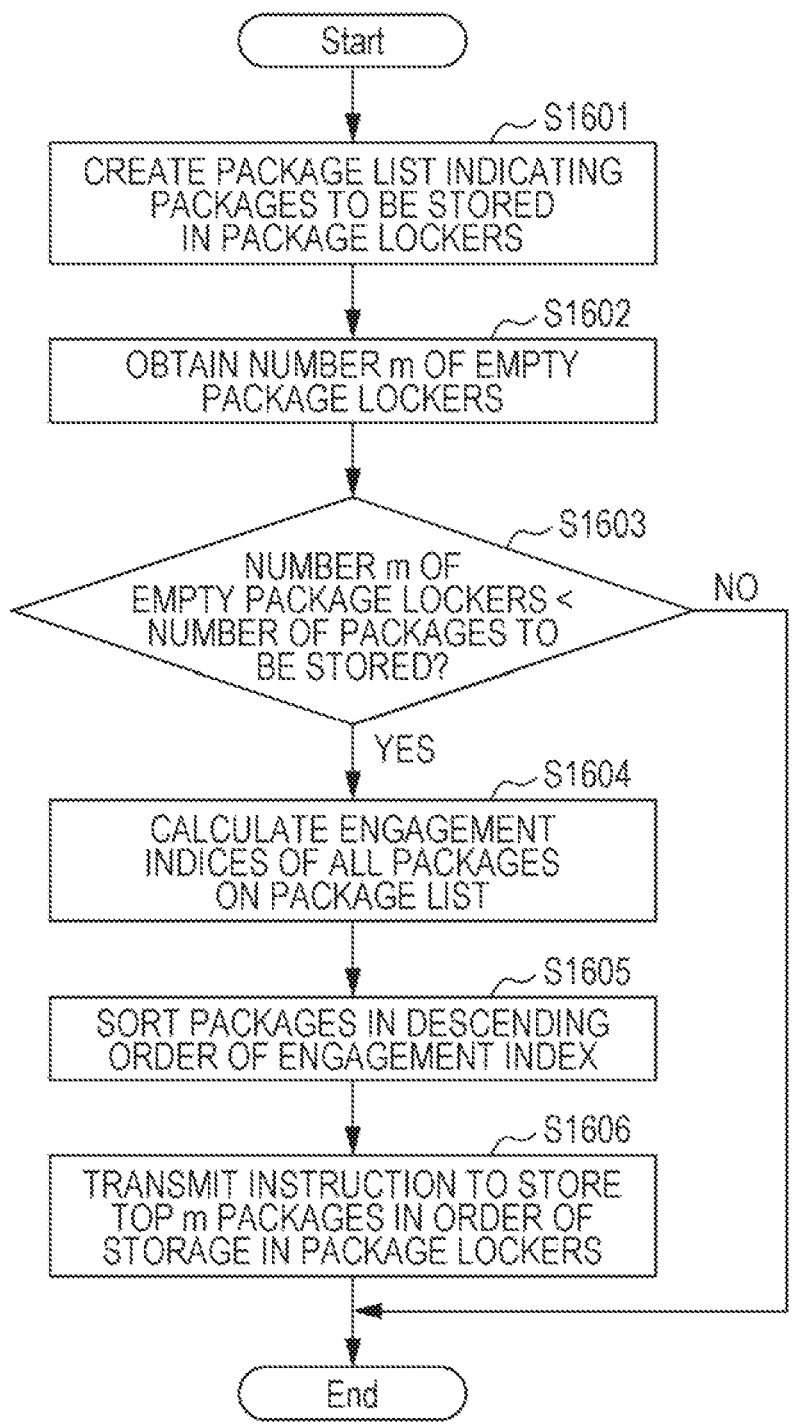
FIG. 16 is a flowchart illustrating an example of a process for determining order of storage in package lockers.

FIG. 16 is a flowchart illustrating an example of a process for determining order of storage in package lockers. The process starts, for example, when the delivery vehicle 4 has arrived at an apartment house but some users are absent and have not received packages. More specifically, the process starts when the driver of the delivery vehicle 4 has input nondelivery information, which indicates that there is at least one package that has not been received by a user, to the delivery terminal 3 and the server 1 has received the nondelivery information. The nondelivery information includes at least an order number of a package that has not been received by a user.

First, the control unit 11 of the server 1 creates, from nondelivery information regarding packages for an apartment house transmitted from the delivery terminal 3, a package list indicating packages to be stored in package lockers provided for the apartment house (S1601). The package list includes at least order numbers of the packages to be stored. The packages on the package list are examples of a locker delivery package.

Next, the server 1 inquires a management apparatus (an example of a third information terminal) that manages the package lockers of a number m of empty package lockers (m is an integer equal to or larger than 1) and obtains the number m of empty package lockers (S1602). Here, the management apparatus that manages the package lockers may be a computer provided inside the package lockers or a server provided on the network NT.

Next, the control unit 11 of the server 1 determines whether the number m of empty package lockers is smaller than the number of packages to be stored (S1603). If the number m of empty package lockers is smaller than the number of packages to be stored (YES in S1603), the server 1 calculates engagement indices for the packages on the package list (S1604). Here, the engagement indices may be calculated using one of the above-described first to fourth calculation methods. Alternatively, when engagement indices have already been calculated and registered to the package database, engagement indices for the packages to be stored may be obtained from the package database.

If the number m of empty package lockers is equal to or larger than the number of packages to be stored (NO in S1603), on the other hand, all the packages to be stored can be stored in the package lockers, and the process ends. In this case, the server 1 may transmit, to the delivery terminal 3, an instruction to deliver all the packages to be stored to the package lockers.

Next, the control unit 11 of the server 1 sorts the packages on the package list in descending order of the engagement index and generates storage order information, which indicates order of storage in the package lockers (S1605).

Next, the control unit 11 of the server 1 extracts top m packages in the order of storage and transmits, to the delivery terminal 3, an instruction to store the m extracted packages in the package lockers (S1606). The driver stores the m packages indicated by the instruction in the package lockers. Although the instruction is transmitted to the delivery terminal 3, this is just an example. The storage order information may be transmitted to the delivery terminal 3, instead. In this case, the driver may store top n packages indicated by the storage order information in the package lockers.

Packages having higher engagement indices thus take priority in storage in the package lockers in the present disclosure. Here, a user who is greatly interested in a package is likely to take out a package from a package locker promptly. In this mode, therefore, a sufficient number of empty package lockers can be secured even though the capacity of the package lockers is limited.

Advance Transmission of Delivery Information Regarding Package Corresponding to High Engagement Index to User In the present disclosure, for a user (hereinafter referred to as a "premium user") to whom a package with an engagement index equal to or higher than a threshold is to be delivered, the server 1 may transmit delivery information including an estimated delivery time to the user terminal 2 when the delivery vehicle 4 has left a delivery center. As the threshold, for example, a value obtained by adding a certain margin to an engagement index corresponding to a user who is moderately interested in a package, namely 0.6, 0.7, 0.8, or 0.9, may be used.

Figure 17:
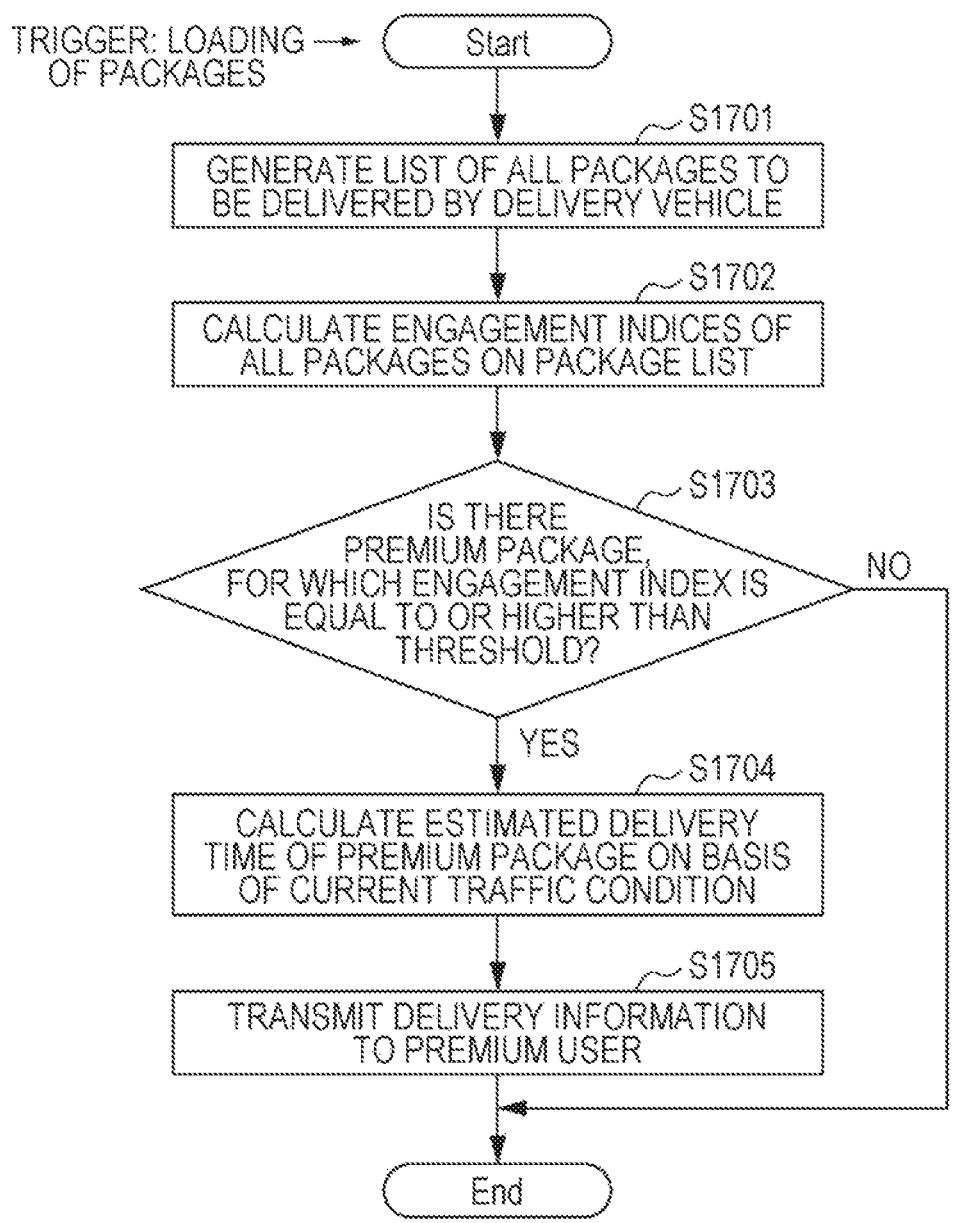
FIG. 17 is a flowchart illustrating an example of a process for transmitting delivery information to a premium user.

FIG. 17 is a flowchart illustrating an example of a process for transmitting delivery information to a premium user. The process starts, for example, when loading of packages into the delivery vehicle 4 has been completed. Here, departure information is transmitted in accordance with an instruction from the driver, for example, when loading of packages into the delivery vehicle 4 has been completed.

First, the control unit 11 of the server 1 generates a package list on which information (e.g., order numbers and destinations) regarding all the packages to be delivered by the delivery vehicle 4 is described (S1701). Here, the server 1 has registered, to the package database (not illustrated), information in which packages to be delivered are assigned to delivery vehicles 4. The server 1 may therefore generate a package list by extracting packages assigned to the corresponding delivery vehicle 4 from the package database. Alternatively, if the departure information includes information regarding packages to be delivered, the server 1 may generate a package list from the information regarding packages to be delivered included in the departure information.

Next, the server 1 calculates engagement indices for the packages on the package list (S1702). Here, the server 1 may calculate the engagement indices for the packages using one of the first to fourth calculation methods. Alternatively, if calculated engagement indices for packages have already been registered to the package database, the server 1 may obtain engagement indices for the corresponding packages from the package database.

Next, the control unit 11 of the server 1 determines whether there is a package (hereinafter referred to as a "premium package") on the package list with an engagement index equal to or higher than a threshold (S1703). If so (YES in S1703), the control unit 11 of the server 1 calculates an estimated delivery time of the premium package on the basis of a current traffic condition (S1704). If not (NO in S1703), on the other hand, the process ends.

Here, the control unit 11 of the server 1 may obtain the current traffic condition by obtaining vehicle information and communication system (VICS) information regarding an area covered by the delivery vehicle 4 from the network NT. The control unit 11 of the server 1 may then apply the VICS information, the destinations of all the packages registered in the package list, and present time to a certain path search algorithm to search for an optimal delivery path for delivering the packages from map information, and calculate estimated delivery times of the packages using the found delivery path. Here, as the path search algorithm, an algorithm such as the A* search algorithm or Dijkstra's algorithm may be used.

Next, the control unit 11 of the server 1 individually generates delivery information including an estimated delivery time and a time of departure of the delivery vehicle 4 from the delivery center for each premium package and transmits the delivery information to the user terminal 2 of the premium user (S1705).

As described above, delivery information including a departure time and an estimated delivery time is transmitted to a premium user, who is a user corresponding to a package with an engagement index equal to or higher than a threshold, when loading of packages into the delivery vehicle 4 has been completed in the present disclosure. A considerate service can therefore be provided for premium users.

Advance Phone Calls to Premium Users

Figure 18:
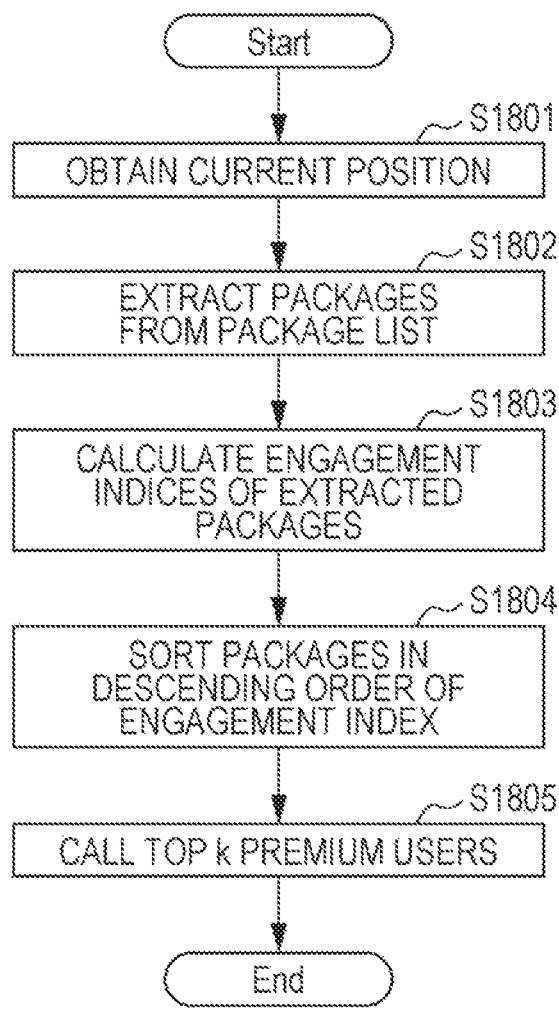
FIG. 18 is a diagram illustrating an example of a process performed by the server to notify a premium user that a package will soon be delivered.

In the present disclosure, the server 1 may notify a premium user that a package will soon be delivered. FIG. 18 is a diagram illustrating an example of a process performed by the server 1 to notify a premium user that a package will soon be delivered. The process starts each time positional information has been obtained from the delivery vehicle 4 after the delivery vehicle 4 leaves a delivery center.

First, the control unit 11 of the server 1 obtains, from the delivery terminal 3, positional information indicating the current position of the delivery vehicle 4 (S1801). Next, the control unit 11 of the server 1 extracts, from a package list on which information regarding all packages to be delivered by the delivery vehicle 4 is described, one or more packages whose destinations are located within a certain range from the current position of the delivery vehicle 4 (S1802). Here, the certain range refers to the certain range D1 illustrated in FIG. 5.

Next, the control unit 11 of the server 1 calculates engagement indices for the extracted packages (S1803). Here, the control unit 11 of the server 1 may calculate the engagement indices for the packages using one of the first to fourth calculation methods. Alternatively, if calculated engagement indices for packages have already been registered to the package database, the server 1 may obtain engagement indices for the corresponding packages from the package database.

Next, the control unit 11 of the server 1 sorts the packages extracted in S1802 in descending order of the engagement index to set order of notification about the packages (S1804).

Next, the control unit 11 of the server 1 sets, as premium users, users corresponding to top k packages (k is an integer equal to or larger than 1) in the set order of notification with engagement indices equal to or higher than a threshold, calls user terminals 2 owned by the k premium users, and notifies the k premium users that packages will soon be delivered (S1805).

Here, a telephone operator achieved by an artificial intelligence (AI) device or a human telephone operator may call the premium users, instead. In addition, phone calls may be made in descending order of the engagement index, or k telephone operators may simultaneously make phone calls. In addition, although phone calls are made here, this is just an example. Emails including messages indicating that a package will soon be delivered may be transmitted to the user terminals 2 owned by the premium users, instead.

A premium user is thus notified that a package will soon be delivered when the delivery vehicle 4 has entered a certain range from a destination in the present disclosure. A considerate service can therefore be provided for premium users.

Keeping Time for Premium Packages

In the present disclosure, if it is detected that a premium package will not be delivered before an estimated delivery time about which a corresponding premium user has been told in advance, the server 1 may raise the premium package in order of delivery and cause the premium package to be delivered before the estimated delivery time.

Figure 19:
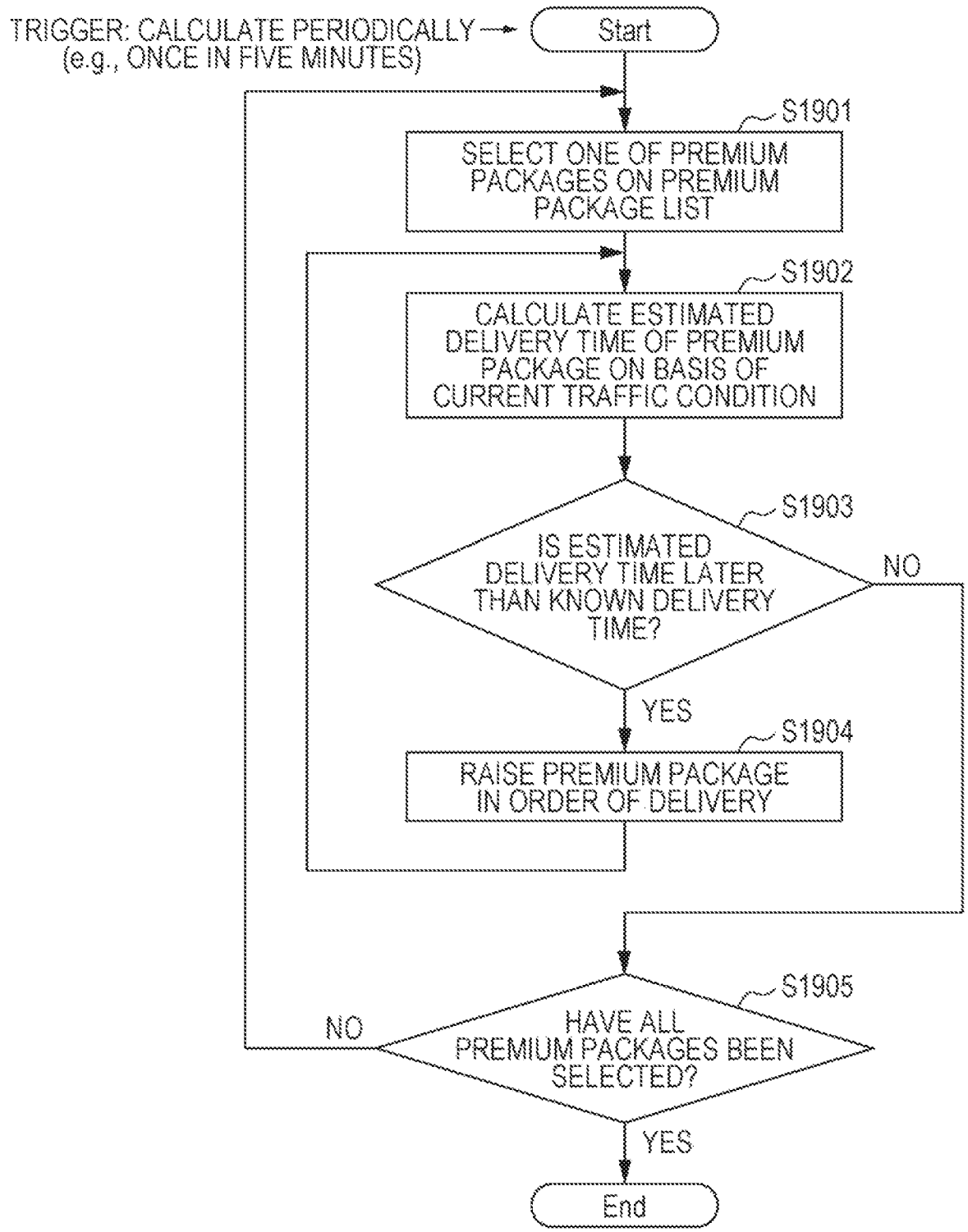
FIG. 19 is a flowchart illustrating an example of a process for delivering a premium package before an estimated delivery time.

FIG. 19 is a flowchart illustrating an example of a process for delivering a premium package before an estimated delivery time. The process is periodically performed, for example, after the delivery vehicle 4 leaves a delivery center. It is assumed that the process illustrated in FIG. 17 has already been performed before this process starts, and a premium user has been notified of an estimated delivery time. The process illustrated in FIG. 19 is performed, for example, at intervals of about five minutes, but this is just an example. A value other than five minutes may be used, instead. It is also assumed that a premium package list, on which information regarding premium packages to be delivered by the delivery vehicle 4 with engagement indices equal to or higher than a threshold is described, is created before the process starts. At least order numbers of the premium packages are described on the premium package list.

First, the control unit 11 of the server 1 selects one of the premium packages on the premium package list (S1901). Here, order in which the premium packages are selected may be, for example, descending order of the engagement index, descending order of distance between the current position of the delivery vehicle 4 and a destination, or any other order.

Next, the control unit 11 of the server 1 calculates an estimated delivery time of the premium package on the basis of a current traffic condition (S1902). Here, a method for calculating an estimated delivery time is the same as that used in S1704, and detailed description thereof is omitted.

Next, the control unit 11 of the server 1 determines whether the estimated delivery time calculated in S1902 is later than a known delivery time (S1903). The known delivery time refers to an estimated delivery time about which the premium user has been told, that is, more specifically, the estimated delivery time calculated in S1704 in FIG. 17.

If determining that the estimated delivery time is later than the known delivery time (YES in S1903), the control unit 11 of the server 1 raises the premium package in the order of delivery by one rank (S1904), and the process returns to S1902. If the control unit 11 of the server 1 determines that the estimated delivery time is not later than the known delivery time (NO in S1903), the process proceeds to S1905.

That is, the control unit 11 of the server 1 raises the premium package in the order of delivery rank by rank until the estimated delivery time becomes earlier than the known delivery time. If a previous package is not a premium package, the control unit 11 of the server 1 raises the premium package by one rank, and if a previous package is also a premium package, the control unit 11 of the server 1 may raise both the premium packages by one rank.

In S1905, the control unit 11 of the server 1 determines whether all the premium packages have been selected. If not (NO in S1905), the process returns to S1901, and the control unit 11 selects a premium package to be processed next. If all the premium packages have been selected (YES in S1905), on the other hand, the control unit 11 of the server 1 ends the process.

Figure 20:
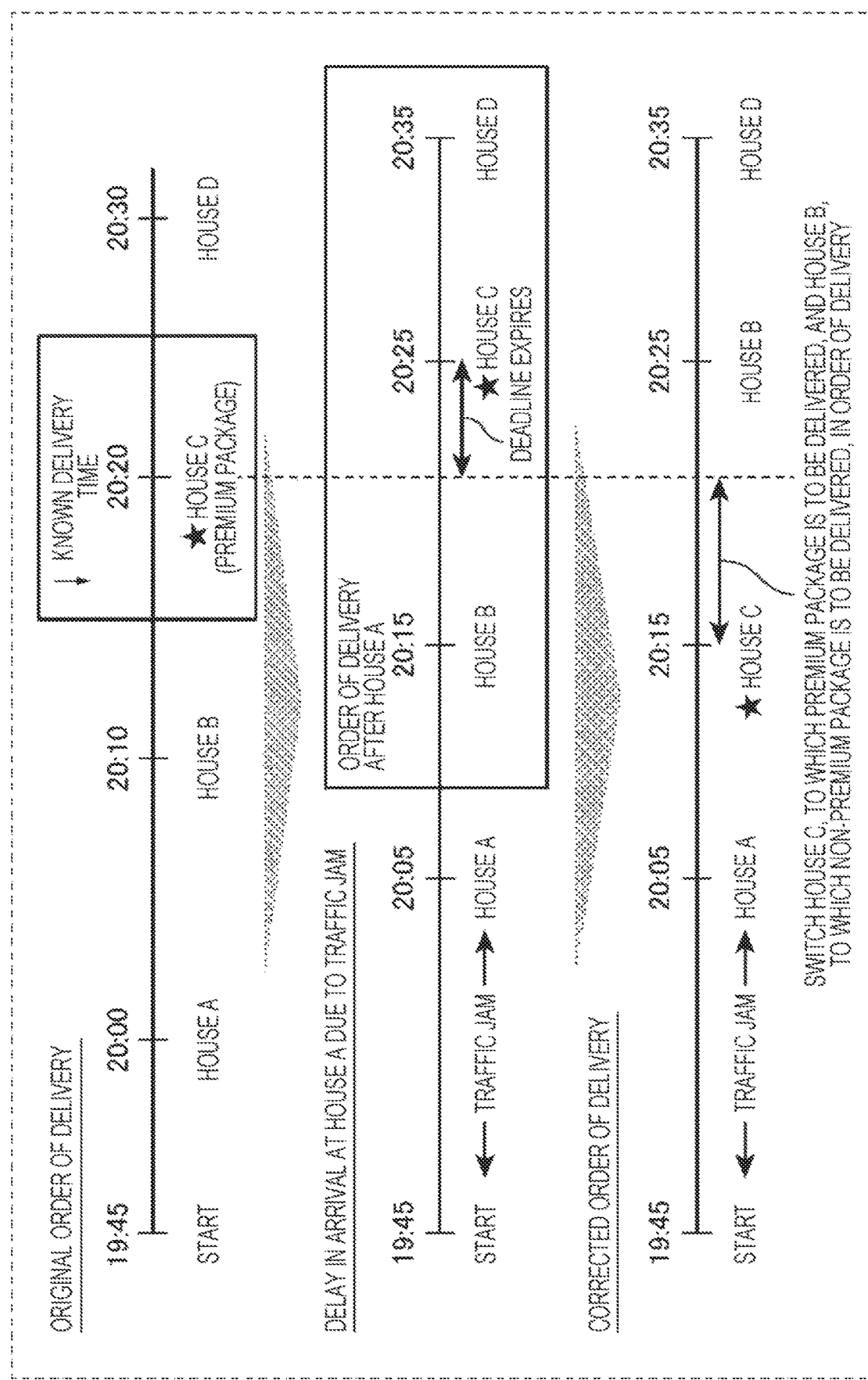
FIG. 20 is a timing chart illustrating a specific example of the process illustrated in FIG. 19.

FIG. 20 is a timing chart illustrating a specific example of the process illustrated in FIG. 19. In FIG. 20, an upper part illustrates original order of delivery, a middle part illustrates a case where arrival at house A is delayed due to a traffic jam, and a lower part illustrates corrected order of delivery.

The original order of delivery may be order of delivery set when the delivery vehicle 4 leaves a delivery center, for example, or may be order of delivery set when the process illustrated in FIG. 19 was previously performed.

In the original order of delivery in the example illustrated in FIG. 20, the delivery vehicle 4 leaves a delivery center at 19:45 and delivers packages to houses A, B, C, and D in this order. In the original order of delivery, estimated delivery times for houses A, B, C, and D are 20:00, 20:10, 20:20, and 20:30, respectively. Houses A, B, C, and D are homes of users UA, UB, UC, and UD, respectively, and destinations of the packages. The user UC is a premium user, who is a user corresponding to package with an engagement index equal to or higher than the threshold, and a premium package is delivered to the user UC. The user UC has already been notified of an estimated delivery time of 20:20. That is, 20:20 is a known delivery time for the user UC.

As illustrated in the middle part of FIG. 20, a traffic jam has occurred while the delivery vehicle 4 is going to house A, and the delivery vehicle 4 has been caught in the traffic jam. After the traffic jam occurs, the control unit 11 of the server 1 calculates the estimated delivery times for houses A to D again by performing the process illustrated in FIG. 19. As a result, estimated delivery times of 20:05, 20:15, 20:25, and 20:35 are obtained. The estimated delivery time for house C is later than 20:20, which is the known delivery time (deadline) for the user UC.

The control unit 11 of the server 1 therefore raises the premium package for the user UC in the order of delivery by one rank. That is, the control unit 11 of the server 1 causes the delivery vehicle 4 to deliver the premium package to user UC between delivery of a package to house A and delivery of a package to house B. The control unit 11 of the server 1 then calculates the estimated delivery times for houses A to D again. As illustrated in the lower part of FIG. 20, estimated delivery times of 20:05, 20:15, 20:25, and 20:35 are calculated for houses A, C, B, and D, respectively. The estimated delivery time of 20:15 for house C is earlier than 20:20, which is the deadline. That is, the delivery vehicle 4 can deliver the premium package before the known delivery time.

In the present disclosure, even in a situation in which it is difficult to deliver a package before a known delivery time due to a traffic jam, for example, order of delivery is corrected such that the delivery vehicle 4 can deliver the package before the known delivery time insofar as the package is a premium package. As a result, a considerate service can be provided for premium users.

Prompt Notification to Premium Users about Failures of Delivery

Figure 21:
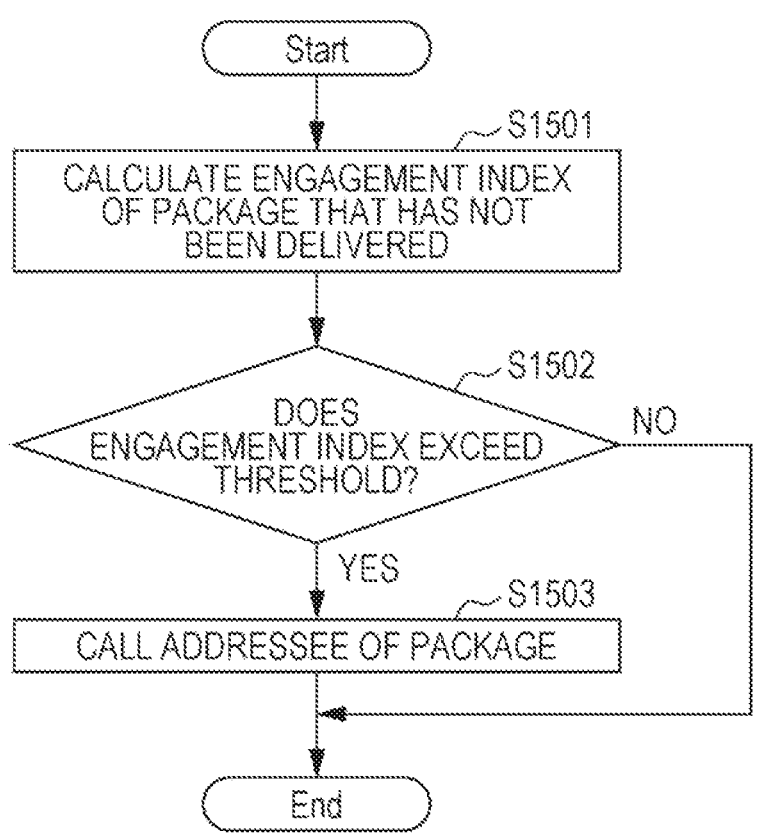
FIG. 21 is a flowchart illustrating an example of a process for notifying a premium user of a failure to deliver a premium package.

In the present disclosure, if the delivery vehicle 4 has failed to deliver a premium package, the server 1 may promptly notify a premium user of the failure. FIG. 21 is a flowchart illustrating an example of a process for notifying a premium user of a failure to deliver a premium package. The process starts when the delivery terminal 3 has transmitted nondelivery information. Here, the nondelivery information is transmitted to the server 1 from the delivery terminal 3 in accordance with an instruction from the driver if the driver has arrived at a destination of a package but failed to hand the package to the premium user. The nondelivery information includes, for example, an order number of the package. Nondelivery information may be transmitted for one or more packages that have not been delivered.

First, the control unit 11 of the server 1 calculates an engagement index for a package indicated by nondelivery information, that is, a package that has not been delivered (S1501). Here, the control unit 11 of the server 1 may calculate the engagement index using one of the above-described first to fourth calculation methods. If engagement indices calculated for packages have already been registered to the package database, the control unit 11 of the server 1 may obtain the engagement index for the package from the package database, instead.

Next, the control unit 11 of the server 1 determines whether the engagement index for the package exceeds a threshold, that is, whether the package is a premium package (S1502). If so (YES in S1502), the control unit 11 of the server 1 calls an addressee of the package, that is, a premium user corresponding to the package, and transmits a notification (an example of nondelivery notification information) about the failed delivery to the premium user (S1503). If not, that is, if the package is not a premium package (NO in S1502), on the other hand, the premium user is not notified of the failure delivery, and the process ends. Here, a telephone operator achieved by an AI device or a human telephone operator may call the premium user, instead.

Although the premium user is called in the above description, the control unit 11 of the server 1 may generate a message (an example of nondelivery notification information) indicating failed delivery and transmit the message to the user terminal 2 of the premium user, instead.

The premium user notified of the failed delivery by telephone or using a message can immediately request delivery of the package by contacting the telephone operator or the driver of the delivery vehicle 4. When the premium user was out in the neighborhood at a time of delivery or at home but was doing something that prevented the premium user from answering the door, for example, the premium user can immediately receive the package by asking the telephone operator or the driver of the delivery vehicle 4 to deliver the package to his/her house again. In doing so, the number of packages remaining in the delivery vehicle 4 can be reduced, and delivery efficiency can be improved.

Classification of Packages into Classes

In the present disclosure, packages may be classified into classes corresponding to different engagement indices, different candidates for a delivery period may be determined for the classes, and users may be allowed to select a desired delivery period from the candidates for the delivery period.

It is assumed hereinafter that the classes include a premium class, a semi-premium class, and a general class in descending order of the engagement index. This, however, is just an example, and the classes may include four or more classes or just two classes, instead.

Figure 22:
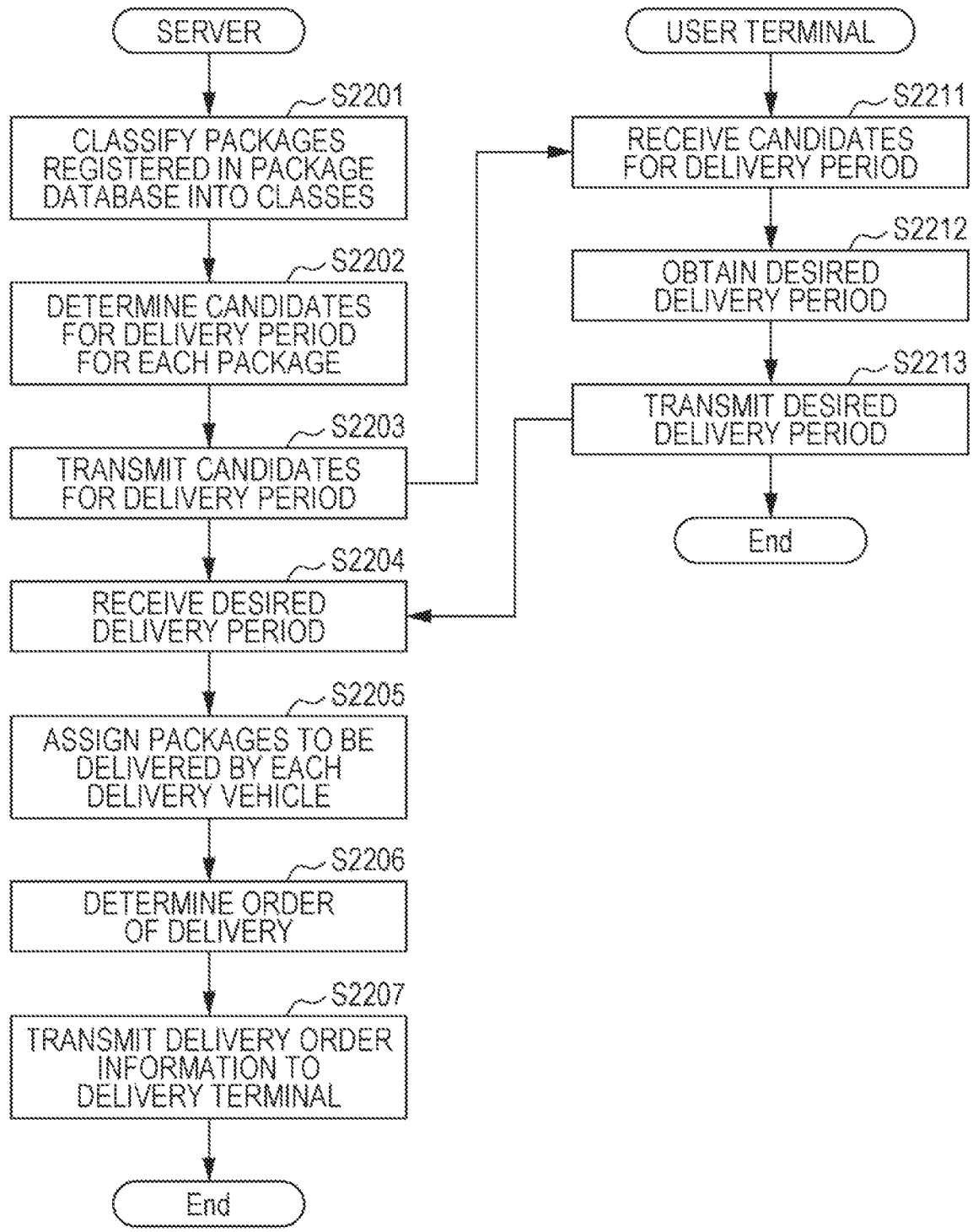
FIG. 22 is a flowchart illustrating an example of a process for classifying packages into classes.

FIG. 22 is a flowchart illustrating an example of a process for classifying packages into classes. The process is performed, for example, at least every day. In S2201, the control unit 11 of the server 1 classifies, into classes, packages that are registered in the package database (not illustrated) and for which scheduled delivery times have not been determined. Here, the control unit 11 of the server 1 classifies the packages into the premium class, the semi-premium class, or the general class on the basis of the engagement indices calculated for the packages. For example, packages with engagement indices within top Z1% among all packages registered in the package database are classified into the premium class, packages with engagement indices within a range of Z1% to Z2% (>Z1%) are classified into the semi-premium class, and the rest of the packages are classified into the general class. Here, a percentage of about 1% to 3% may be used as Z1%, and a percentage of about 10% is used as Z2%.

In S2202, the control unit 11 of the server 1 determines candidates for a delivery period for each package. Here, a time span of candidates for a delivery period of the packages belonging to the premium class is set to a first time span, a time span of candidates for a delivery period of the packages belonging to the semi-premium class is set to a second time span, which is longer than the first time span, and a time span of candidates for a delivery period of the packages belonging to the general class is set to a third time span, which is longer than the second time span. For example, the first time span is 30 minutes, the second time span is an hour, and the third time span is two hours. An example of a delivery period having the first time span is 9:00 to 9:30, an example of a delivery period having the second time span is 9:00 to 10:00, and an example of a delivery period having the third time span is 9:00 to 11:00.

As a result, a user corresponding to a package belonging to the premium class can select a desired delivery period at time intervals of 30 minutes, a user corresponding to a package belonging to the semi-premium class can select a desired delivery period at time intervals of an hour, and a user corresponding to a package belonging to the general class can select a desired delivery period at time intervals of two hours.

Candidates for a delivery period refers to candidates for a period selectable as a desired delivery period by a user who is to receive a package. In the present disclosure, with respect to the premium class, sections obtained by dividing operation hours of the delivery vehicle 4 of a day with the first time span are determined as candidates for a delivery period. With respect to the semi-premium class, sections obtained by dividing the operation hours with the second time span are determined as candidates for a delivery period. With respect to the general class, sections obtained by dividing the operation hours with the third time span are determined as candidates for a delivery period. The operation hours are, for example, 9 to 21.

In S2203, the control unit 11 of the server 1 transmits, using the communication unit 12, the candidates for the delivery period to the user terminals 2 owned by the users who are to receive the packages classified in S2201.

In S2211, the control unit 21 of each user terminal 2 receives, using the communication unit 25, the candidates for the delivery period transmitted from the server 1 and displays the candidates for the delivery period on the display unit 36. The candidates for the delivery period according to the engagement index are thus presented to each user. An example of the candidates for the delivery period is 9:00 to 9:30, 9:30 to 10:00, . . . , and 20:30 to 21:00.

In S2212, the control unit 21 of each user terminal 2 obtains one of the candidates for the delivery period selected by the user using the operation unit 23 as a desired delivery period. In this case, the display unit 36 of the user terminal 2 owned by each user displays, for example, a user interface with which a desired delivery period, which is based on the time span according to the class, can be selected in the operation hours of the delivery vehicle 4 of a day. The user may input an operation for selecting a desired delivery period with the user interface to cause the control unit 21 of the user terminal 2 to obtain the desired delivery period. The user interface may be configured to be able to select a desired delivery date. In this case, the control unit 21 of each user terminal 2 obtains a desired delivery date as well as the desired delivery period.

In S2213, the communication unit 25 of each user terminal 2 transmits the desired delivery period obtained in S2212 to the server 1. If a desired delivery date has also been obtained, the desired delivery date is transmitted along with the desired delivery period.

In S2204, the communication unit 12 of the server 1 receives the desired delivery period transmitted from the user terminal 2.

In S2205, the control unit 11 of the server 1 refers to the package database and assigns packages to be delivered by each delivery vehicle 4 on the day. Here, the control unit 11 of the server 1 may assign the packages using addresses of destinations of the packages. If there is a package whose desired delivery date has been specified in this case, the packages may be assigned to each delivery vehicle 4 on the day while taking into consideration the desired delivery date. The control unit 11 of the server 1 may assign packages whose desired delivery dates have not been specified to each delivery vehicle 4 on the day such that delivery dates become as early as possible while giving priority to the package whose desired delivery date has been specified.

In S2206, the control unit 11 of the server 1 determines order of delivery of the packages assigned to each delivery vehicle 4. Here, the control unit 11 of the server 1 may determine the order of delivery of the packages by solving an optimization problem such that the packages can be delivered in their respective desired delivery periods. For example, the control unit 11 of the server 1 may determine the order of delivery by searching, using the addresses of the destinations of the packages, map information for a delivery path with which delivery cost becomes minimum under a condition that the packages be delivered in their respective desired delivery periods and determining scheduled delivery times of the packages.

In S2207, the control unit 11 of the server 1 transmits, to the delivery terminal 3 using the communication unit 12, delivery order information indicating the order of delivery of the packages determined in S2206 for each delivery vehicle 4. In this case, the control unit 11 of the server 1 may transmit the delivery order information to the delivery terminal 3 when the delivery vehicle 4 begins delivery of the day.

Upon receiving the delivery order information, the delivery terminal 3 may display the order of delivery indicated by the delivery order information on the display unit 36 and guide the driver in accordance with the order of delivery.

In the present disclosure, a time span of candidates for a delivery period is set short for packages belonging to a class with a high engagement index. A user corresponding to a package belonging to the class corresponding to a high engagement index, therefore, can select a desired delivery period more finely. As a result, the user can receive the package in a timely manner.

The following modification may be employed for the classification of packages.

Although the operation hours of the delivery vehicle 4 remain the same regardless of the class in the above description, the present disclosure is not limited to this. Different operation hours may be used, instead, depending on the class. In this case, the operation hours may become longer as the engagement index of the class becomes higher.

For the general class, for example, ordinary operation hours (e.g., from 9 to 21) may be used as the operation hours.

For the semi-premium class, semi-premium operation hours (e.g., from 5 to 24), which include the ordinary operation hours and are longer than the ordinary operation hours, may be used as the operation hours. For the premium class, premium operation hours (e.g., from 0 to 24), which include the semi-premium operation hours and are longer than the semi-premium operation hours, may be used as the operation hours. The ordinary operation hours correspond to an example of first operation hours, and the semi-premium operation hours and the premium operation hours correspond to an example of second operation hours. Although three different operation hours are used in accordance with the classes here, two different operation hours may be used when there are two classes, and four or more different operation hours may be used when there are four or more classes.

As a result, a user corresponding to a package belonging to the premium class can select a desired delivery period with at time intervals of 30 minutes, a user corresponding to a package belonging to the semi-premium class can select a desired delivery period at time intervals of an hour, and a user corresponding to a package belonging to the general class can select a desired delivery period at time intervals of two hours.

In the present modification, operation hours for users corresponding to packages belonging to the premium class or the semi-premium class are thus set longer than those for users corresponding to packages belonging to the general class. As a result, the users corresponding to the packages belonging to the premium class or the semi-premium class feel prioritized and are effectively differentiated from the users corresponding to the packages belonging to the general class.

Self-driving delivery vehicles 4 for delivering packages are expected to spread as a result of evolution of AI technologies. There will no longer be a traditional concept of operation hours, and packages can be delivered around the clock. In the present modification, therefore, when self-driving delivery vehicles 4 are widely used, a sense of priority can be effectively given to users corresponding to packages with high engagement indices.

When packages are classified into classes as described above, the following modification may also be employed. When packages to be delivered by a certain delivery vehicle 4 include packages that belong to the premium class and whose destinations are in the same apartment house, building, or site, for example, the control unit 11 of the server 1 may classify one (an example of a top certain number) of the packages as a package belonging to the premium class and downgrade the rest of the packages as packages belonging to the semi-premium class or the general class. The same apartment house, building, and site will be generically referred to as the "same building" hereinafter.

As described above, users corresponding to packages belonging to the premium class can select a desired delivery period at time intervals of 30 minutes. It is therefore possible, for example, that there are two users in the same building corresponding to packages belonging to the premium class and one of the users (first user) selects a period of 9:00 to 9:30 as a desired delivery period for his/her package and the other user (second user) selects a period of 10:00 to 10:30 as a desired delivery period for his/her package. In this case, the delivery vehicle 4 needs to return to the same building to deliver the package to the second user in the period of 10:00 to 10:30 after delivering the package to the first user in the period of 9:00 to 9:30, which decreases delivery efficiency.

In the present modification, the number of packages belonging to the premium class in the same building is limited to one. The package for the first user, therefore, remains belonging to the premium class, and the package for the second user is downgraded to the semi-premium class or the general class. That is, the control unit 11 of the server 1 may change the package for the second user from the premium class to the semi-premium class or the general class. Here, users corresponding to packages belonging to the semi-premium class or the general class select a desired delivery period only at time intervals of one hour or two hours. A possibility that the second user corresponding to the downgraded package will select a period, such as a period of 9:00 to 10:00 or 9:00 to 11:00, overlapping a desired delivery period selected by the first user as a desired delivery period, therefore, is likely to increase. As a result, the delivery vehicle 4 can deliver the packages for the first and second users at once, which increases delivery efficiency.

Although the number of packages to remain belonging to the premium class is one in the above description, this is just an example. The number of packages to remain belonging to the premium class may be two, instead. In addition, although packages belonging to the premium class are downgraded in the above description, packages belonging to the semi-premium class may also be downgraded. For example, the number of packages belonging to the premium class in the same building may be limited to one, and other packages belonging to the premium class may be downgraded to the semi-premium class or the general class. At the same time, the number of packages belonging to the semi-premium class in the same building may be limited to one, and other packages belonging to the semi-premium class may be downgraded to the general class.

When the present modification is implemented, packages originally belonging to the premium class are downgraded, and users corresponding to the downgraded packages might undesirably feel a sense of unfairness. A user who knows well about this mechanism might frequently access the website for providing the delivery condition app or the delivery condition notification service, for example, to increase an engagement index thereof for a package. In this case, packages for this user can undesirably always be classified as premium packages in the same building.

In the present disclosure, therefore, the following mode may be employed.

In the above example, for example, a next package to be delivered to a user corresponding to a downgraded package may be classified as a premium package, and a next package to be delivered to a user corresponding to a package classified as a premium package may be classified into the semi-premium class or the general class. More specifically, the control unit 11 of the server 1 holds information regarding a user corresponding to a downgraded package in the memory 13 as a downgrading history. If it is detected on the basis of the downgrading history that there are two or more users corresponding to premium packages in the same building, the control unit 11 of the server 1 may determine a user whose package is to be classified as a premium package in rotation. When a premium package PP1 for a user PU1 has been maintained in the premium class and a premium package PP2 for a user PU2 has been downgraded to the semi-premium class or the general class in current delivery, for example, a premium package PP3 for the user PU1 may be downgraded to the semi-premium class or the general class and a premium package PP4 for the user PU2 may be maintained in the premium class in next delivery. As a result, a user corresponding to a downgraded package does not feel a sense of unfairness, and a situation in which only packages for a particular user are classified as premium packages in the building can be avoided.

In addition, in order to reduce a sense of unfairness of a user corresponding to a downgraded package, the control unit 11 of the server 1 may transmit, to the user terminal 2 of the user using the communication unit 12, a message indicating that although a package has been downgraded in current delivery, a package to be delivered next can be classified as a premium package.

In addition, although packages to be delivered to the same building are subjected to downgrading in the above description, the present disclosure is not limited to this. For example, packages to be delivered to an area within a certain radius may be subjected to downgrading, instead. The certain radius may be, for example, 10 m, 20 m, or 30 m. If there are two or more premium packages to be delivered to a small area, delivery efficiency might undesirably decrease as in a case where premium packages are to be delivered to the same building. If there are two or more packages in the premium class to be delivered to an area within the certain range, therefore, the control unit 11 of the server 1 may classify one of the packages into the premium class and the other packages to the semi-premium class or the general class. In this case, the control unit 11 of the server 1 may hold a downgrading history including information regarding a user corresponding to a downgraded package in the memory 13 and determine, among packages to be delivered to the same area, a package to be classified into the premium class in rotation using the downgrading history.

Inputting Order Number

A website for providing the delivery condition notification service illustrated in FIG. 13 may have a function of presenting a scheduled delivery date and a scheduled delivery time of a package to a user if the user inputs an order number of the package after a request to deliver the package is received from the user.

Figures 23, 24:
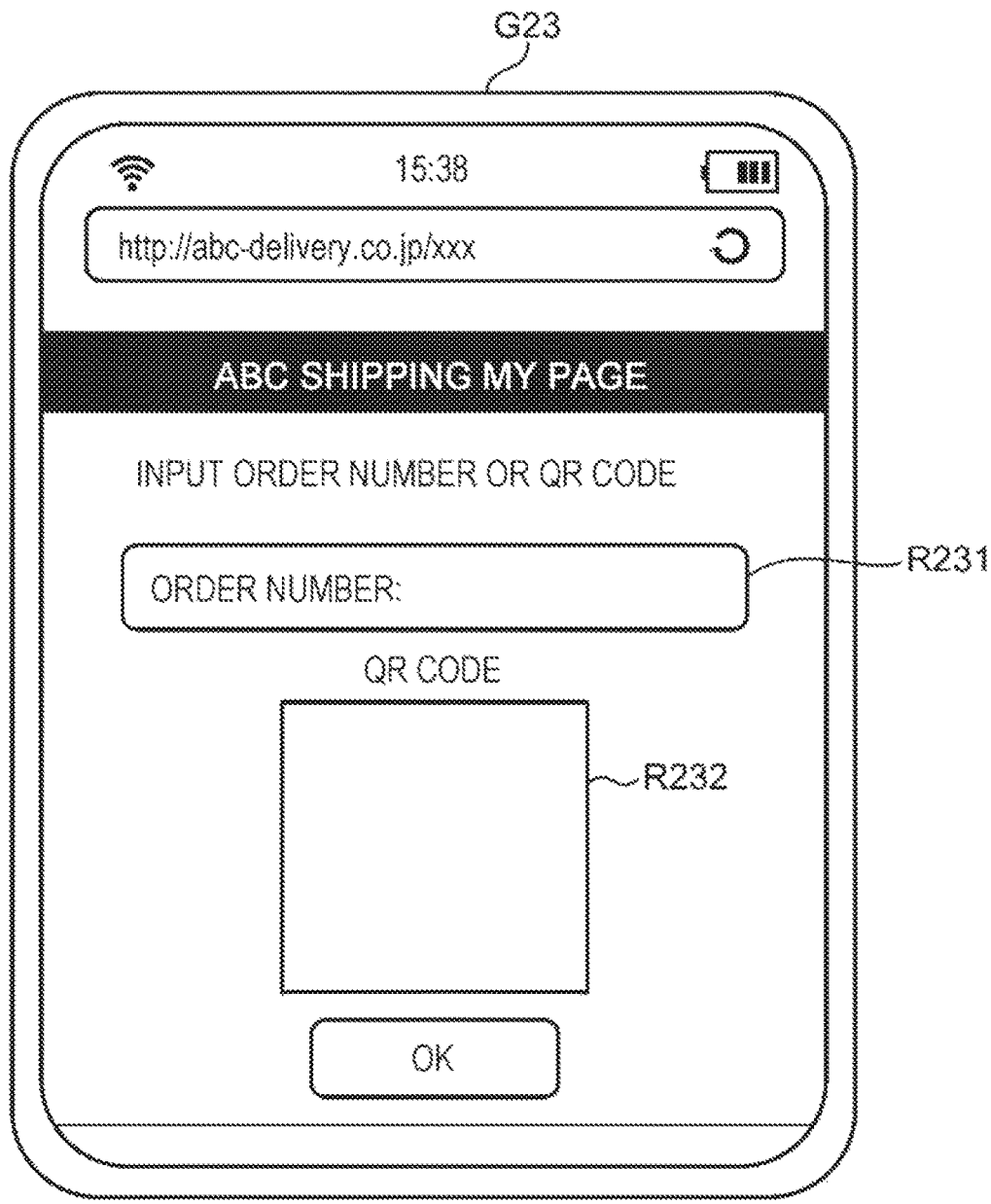
FIG. 23 is a diagram illustrating an example of an order number input screen of the website for providing the delivery condition notification service.
FIG. 24 is a diagram illustrating an example of the data structure of a delivery schedule table stored in a memory of the server.

FIG. 23 is a diagram illustrating an example of an order number input screen G23 of the website for providing the delivery condition notification service.

The input screen G23 is displayed on the display unit 26 of the user terminal 2, for example, when the user has performed an operation for selecting a button, which is not illustrated, for displaying the input screen G23 on the notification screen G131 illustrated in FIG. 13.

The input screen G23 includes an order number input field R231 and a quick response (QR) code (registered trademark) input field R232. The user operates the operation unit 23 to input, to the input field R231, an order number of a package issued when the user has requested delivery of the package. As a result, the communication unit 25 of the user terminal 2 transmits the input order number to the server 1.

If a QR code has been issued when the user has requested the delivery of the package, the user displays the QR code in the input field R232 and causes a camera included in the user terminal 2 to capture the QR code. As a result, the control unit 11 of the user terminal 2 converts the QR code into an order number and transmits the order number to the server 1 using the communication unit 25.

FIG. 24 is a diagram illustrating an example of the data structure of a delivery schedule table T24 stored in the memory 13 of the server 1. The delivery schedule table T24 has been created in advance by extracting information regarding scheduled delivery times of packages from the package data and stored in the memory 13.

More specifically, the delivery schedule table T24 includes fields of "order number", "user ID", "scheduled delivery date", and "scheduled delivery time". "Order number" indicates an identifier for uniquely identifying each package registered in the package database and is issued, for example, when the control unit 11 of the server 1 has received a request to deliver the package. "User ID" indicates an identifier of a user to receive each package. "Scheduled delivery date" indicates a scheduled date on which each package is to be delivered to a user and is determined by the control unit 11 of the server 1. "Scheduled delivery time" indicates a scheduled time at which each package is to be delivered to a user and is determined by the control unit 11 of the server 1.

When the communication unit 12 has received an order number of a package transmitted from the user terminal 2, the control unit 11 of the server 1 obtains a record corresponding to the order number from the delivery schedule table T24 and reads a scheduled delivery date and a scheduled delivery time stored in the record. The control unit 11 of the server 1 transmits, using the communication unit 12, the read scheduled delivery date and scheduled delivery time to the user terminal 2 that has transmitted the order number.

When the communication unit 25 has received the transmitted scheduled delivery date and scheduled delivery time, the control unit 21 of the user terminal 2 displays a webpage including the scheduled delivery date and the scheduled delivery time on the display unit 26. In this case, the control unit 21 of the user terminal 2 may display, for example, the notification screen G132 illustrated in a right part of FIG. 13 on the display unit 26.

If the user has input an order number and viewed a scheduled delivery date and a scheduled delivery time, the control unit 21 of the user terminal 2 may associate a viewing time and a user ID with each other and transmit the viewing time and the user ID to the server 1. As a result, the control unit 11 of the server 1 can detect the viewing time at which the user has viewed the scheduled delivery date and the scheduled delivery time.

The control unit 11 of the server 1 may then calculate a difference between a transmission time and a viewing time of a delivery notification mail transmitted to the user terminal 2 when delivery of a package has been ordered, and calculate an engagement index using expressions (1) and (2).

When this mode is employed, the mode in which a delivery notification mail is transmitted, which has been described in the first method for calculating an engagement index, and the mode in which a condition of a package is provided for the user through the website for providing the delivery notification service described with reference to FIG. 13 may be combined together.

Although the input screen G23 illustrated in FIG. 23 is used in the example of the website for providing the delivery notification service illustrated in FIG. 13, this is just an example. The input screen G23 may be used in the example of the delivery condition app illustrated in FIG. 9, instead.

The present disclosure may employ the following modification.

(1) Although not specified in the above description, the present disclosure also includes a mode in which two or more packages are delivered to one user. In this case, the server 1 may individually calculate engagement indices for the two or more packages for the user and determine order of delivery.

(2) In the above description, packages located within the certain range D1 from the current position of the delivery vehicle 4 are extracted from the package list, and order of delivery of the extracted packages is set on the basis of the engagement indices. The present invention, however, is not limited to this. Order of delivery of all packages described on the package list may be calculated on the basis of engagement indices, instead.

In the above embodiment, a process performed by a certain processing unit may be performed by another processing unit, instead. The order of the processes described in the above embodiment is an example. The order of the processes may be changed or the processes may be performed in parallel with one another.

In addition, in the above embodiment, the components such as the control unit may be achieved by executing a software program suitable for the components. The components may be achieved by reading and executing a software program stored in a hard disk or a storage medium such as a semiconductor memory using a program execution unit such as a CPU or a processor, instead.

Alternatively, the components such as the control unit may be achieved by hardware. More specifically, the components such as the control unit may be achieved by circuits or integrated circuits. These circuits may collectively form a single circuit or may be discrete circuits. These circuits may each be a general-purpose circuit or a dedicated circuit.

The present disclosure also includes modes achieved by modifying the embodiment in various ways conceivable by those skilled in the art and modes achieved by appropriately combining together components or functions described in the embodiment without deviating from the scope of the present disclosure.

The present disclosure is effective for physical distribution systems for online shipping, since appropriate order of delivery can be set without a necessity for a user to explicitly input an urgency level of delivery of a package.

What is claimed is:

1. A presentation server that presents order of delivery of packages to be delivered by a delivery vehicle, the presentation server comprising:
a hardware processor;
a non-transitory memory; and
a communication circuit,
wherein the communication circuit is communicably connected to one or more first information terminals, which are information terminals owned by one or more users to which the packages are to be delivered, and a second information terminal, which is an information terminal provided for the delivery vehicle, over a certain network, the communication circuit being configured to transmit delivery notification information for notifying each of the one or more users of the one or more first information terminals of information regarding the corresponding package, and receive viewing time information indicating a viewing time of the delivery notification information from each of the one or more first information terminals, the viewing time information being stored in the non-transitory memory,
wherein the hardware processor detects the viewing times of the delivery notification information of each of the one or more users of the one or more information terminals included in the viewing time information and calculates a degree of interest of each of the one or more users in the corresponding package and sets an order of delivery of the packages on a basis of the degrees of interest, each degree of interest and the order to delivery being calculated on the basis of a difference between a transmission time of the delivery notification information corresponding to the package and the viewing time indicated by the viewing time information,
the communication circuit transmits delivery order information indicating the order of delivery to the second information terminal, and
wherein a screen indicating the order of delivery corresponding to packages is displayed on the second information terminal based on the delivery order information, and a user determined to have a shortest period between the transmission time of the delivery notification information and the viewing time of the delivery notification information is determined to have a highest degree of interest and is listed first in the order of delivery on the screen.

2. The presentation server according to claim 1, wherein the hardware processor calculates a higher degree of interest for a package whose difference is smaller and sets a package with a higher degree of interest higher in the order of delivery.

3. The presentation server according to claim 1, wherein the hardware processor calculates a higher degree of interest for a package whose difference is smaller, classifies each of the packages into one of classes corresponding to different degrees of interest, determines candidates for each of delivery periods such that the classes have different time spans, transmits the candidates for one of the delivery periods to each of the first information terminals, obtains, from the first information terminal, a desired delivery period selected by the corresponding user from the candidates for the delivery period, and sets the order of delivery of the packages such that the packages are delivered within the corresponding desired delivery periods.

4. The presentation server according to claim 3, wherein the hardware processor sets a shorter time span for the candidates for the delivery period for a class corresponding to a higher degree of interest.

5. The presentation server according to claim 3, wherein the hardware processor determines the candidates for the delivery period within first operation hours for a package belonging to a first class and the candidates for the delivery period within second operation hours including a period other than the first operation hours and the first operation hours.

6. The presentation server according to claim 3, wherein, if there are, among the packages, two or more packages whose destinations are in a same apartment house, building, or site and that belong to a certain class, the processor classifies, among the two or more packages belonging to the certain class, a top certain number of packages into the certain class and the other packages into a class corresponding to a degree of interest lower than a degree of interest corresponding to the certain class.

7. The presentation server according to claim 3, wherein, if there are, among the packages, two or more packages whose destinations are located within a certain radius and that belong to a certain class, the processor classifies, among the two or more packages belonging to the certain class, a top certain number of packages into the certain class and the other packages into a class corresponding to a degree of interest lower than a degree of interest corresponding to the certain class.

8. The presentation server according to claim 1,
wherein the information regarding each of the packages includes at least an identifier for uniquely identifying the package.

9. The presentation server according to claim 1,
wherein the information regarding each of the packages further includes information indicating a scheduled delivery date or a scheduled delivery time of the package, a current position of the package, and a delivery condition of the package.

10. The presentation server according to claim 1,
wherein the non-transitory memory stores a delivery schedule table on which an identifier for uniquely identifying each of the packages and a scheduled delivery date and a scheduled delivery time of the package are associated with each other,
the one or more first information terminals are used to view information regarding the corresponding packages,
if an identifier input by one of the users is obtained from the corresponding first information terminal, the processor identifies, on the delivery schedule table, a scheduled delivery date or a scheduled delivery time corresponding to the identifier and transmits the identified scheduled delivery date or scheduled delivery time to the first information terminal, and
the first information terminal outputs the transmitted scheduled delivery date or scheduled delivery time.

11. The presentation server according to claim 10,
wherein the hardware processor detects a viewing time at which each of the users has viewed the scheduled delivery date or the scheduled delivery time of the corresponding package, and
the degree of interest is calculated on the basis of a difference between the transmission time of the delivery notification information corresponding to each of the packages and the detected viewing time.

12. A presentation server that presents order of delivery of packages to be delivered by a delivery vehicle, the presentation server comprising:
a processor;
a non-transitory memory; and
a communication circuit,
wherein the communication circuit is communicably connected to one or more first information terminals, which are information terminals owned by one or more users to which the packages are to be delivered, and a second information terminal, which is an information terminal provided for the delivery vehicle, over a certain network, the communication circuit being configured to transmit delivery notification information for notifying each of the one or more users of the one or more first information terminals of information regarding the corresponding package, and receive viewing information indicating that the delivery notification information has been viewed on a first information terminal of the one or more first information terminals, the viewing information being stored in the non-transitory memory
the hardware processor detects the viewing times of the delivery notification information of each of the one or more users of the one or more information terminals included in the viewing time information and calculates a degree of interest of each of the one or more users in the corresponding package and sets an order of delivery of the packages on a basis of the degrees of interest, each degree of interest and the order to delivery being calculated on the basis of a viewing ratio of the delivery notification information calculated from the viewing information corresponding to the package,
the communication circuit transmits delivery order information indicating the order of delivery to the second information terminal, and
wherein a screen indicating the order of delivery corresponding to packages is displayed on the second information terminal based on the delivery order information, and a user determined to have a shortest period between the transmission time of the delivery notification information and the viewing time of the delivery notification information is determined to have a highest degree of interest and is listed first in the order of delivery on the screen.

13. The presentation server according to claim 6,
wherein the hardware processor sets a package with higher degree of interest higher in the order of delivery.

14. The presentation server according to claim 1,
wherein the packages include locker delivery packages, which are to be delivered to package lockers,
the communication circuit receives empty information, which indicates empty package lockers, from a third information terminal that manages the empty lockers,
if determining on the basis of the empty information that a number of package lockers is not enough to store all the locker delivery packages, the hardware processor sets order of storage of the locker delivery packages in the package lockers in descending order of the degree of interest, and
the communication circuit transmits storage order information, which indicates the order of storage, to the second information terminal.

15. The presentation server according to claim 1,
wherein the communication circuit receives departure information, which indicates that the delivery vehicle has left a delivery center,
if receiving the departure information, the hardware processor calculates an estimated delivery time of each of the packages on the basis of a reception time of the departure information and a destination of the package and identifies, as a premium user, a user whose degree of interest is equal to or higher than a threshold, and
the communication circuit transmits the estimated delivery time to the first information terminal owned by the premium user.

16. The presentation server according to claim 15,
wherein, if detecting that a destination of a package for the premium user is located within a certain range from a current position of the delivery vehicle, the hardware processor notifies the first information terminal owned by the premium user that the package will soon be delivered.

17. The presentation server according to claim 15,
wherein the communication circuit receives positional information indicating a current position of the delivery vehicle and traffic information regarding a delivery area of the delivery vehicle,
the hardware processor calculates an estimated delivery time of a package for the premium user on the basis of the received positional information and traffic information, present time, and a destination of the package for the premium user and corrects, if determining that the calculated estimated delivery time is later than an estimated delivery time that has already been transmitted to the premium user, the order of delivery such that the package for the premium user will be delivered before the estimated delivery time that has already been transmitted to the premium user, and the communication circuit transmits the corrected delivery information to the second information terminal.

18. The presentation server according to claim 1,
wherein the communication circuit receives nondelivered information, which indicates that one of the packages has not been delivered, from the second information terminal, if the nondelivery information is received and a user corresponding to the package that has not been delivered is a premium user, whose degree of interest is equal to or higher than a threshold, the hardware processor generates nondelivery notification information for notifying the premium user that the package has not been delivered, and the communication circuit transmits the nondelivery notification information to the first information terminal owned by the premium user.

19. The presentation server according to claim 1,
wherein the communication circuit receives positional information indicating a current position of the first information terminal, and the hardware processor extracts, from the packages, packages whose destinations are located within a certain range from the current position and sets the order of delivery of the extracted packages on the basis of the corresponding degrees of interest.

20. A presentation method used by a presentation server including a hardware processor, a non-transitory memory, and a communication circuit to present order of delivery of packages to be delivered by a delivery vehicle, the communication circuit being communicably connected to one or more first information terminals, which are information terminals owned by one or more users to which the packages are to be delivered, and a second information terminal, which is an information terminal provided for the delivery vehicle, over a certain network, the presentation method comprising:

transmitting delivery notification information for notifying each of the users of information regarding the corresponding package to the first information terminal owned by the user;

receiving viewing time information indicating a viewing time of the delivery notification information from each of the first information terminals, and storing the viewing time information in the non-transitory memory;

detecting the viewing times of the delivery notification information of each of the one or more users of the one or more first information terminals included in the viewing time information and calculating a degree of interest of each of the users in the corresponding package, the degree of interest being calculated on a basis of a difference between a transmission time of the delivery notification information corresponding to the package and the viewing time indicated by the viewing time information;

setting an order of delivery of the packages on the basis of the degrees of interest; and transmitting delivery order information indicating the order of delivery to the second information terminal, wherein a screen indicating the order of delivery corresponding to packages is displayed on the second information terminal based on the delivery order information, and a user determined to have a shortest period between the transmission time of the delivery notification information and the viewing time of the delivery notification information is determined to have a highest degree of interest and is listed first in the order of delivery on the screen.

21. A presentation method used by a presentation server including a hardware processor, a non-transitory memory, and a communication circuit to present order of delivery of packages to be delivered by a delivery vehicle, the communication circuit being communicably connected to one or more first information terminals, which are information terminals owned by one or more users to which the packages are to be delivered, and a second information terminal, which is an information terminal provided for the delivery vehicle, over a certain network, the presentation method comprising:

transmitting delivery notification information for notifying each of the users of information regarding the corresponding package to the first information terminal owned by the user;

receiving viewing information indicating that the delivery notification information has been viewed on the first information terminal from each of the first information terminals, and storing the viewing information in the non-transitory memory;

detecting the viewing times of the delivery notification information of each of the one or more users of the one or more first information terminals included in the viewing time information and calculating a degree of interest of each of the users in the corresponding package, the degree of interest being calculated on a basis of a viewing ratio of the delivery notification information calculated from the viewing information corresponding to the package;

setting an order of delivery of the packages on the basis of the degrees of interest; and transmitting delivery order information indicating the order of delivery to the second information terminal, wherein a screen indicating the order of delivery corresponding to packages is displayed on the second information terminal based on the delivery order information, and a user determined to have a shortest period between the transmission time of the delivery notification information and the viewing time of the delivery notification information is determined to have a highest degree of interest and is listed first in the order of delivery on the screen.

22. A presentation server comprising:
a communication circuit that repeats transmission of an i-th piece of information regarding an i-th package to an i-th terminal owned by an i-th user at an i-th transmission time and reception of an i-th piece of viewing time information, which indicates that the i-th piece of information has been viewed at an i-th viewing time, from the i-th terminal, where i=1 to n; and a hardware processor that repeats detection of the i-th piece of viewing time information and calculation of an i-th degree of interest in the i-th package based on an i-th difference between the i-th viewing time and the i-th transmission time, where i=1 to n, wherein i is a natural number and n is a natural number equal to or larger than 2, a p-th difference corresponding to a p-th package is smaller than a q-th difference corresponding to a q-th package, a p-th degree of interest is larger than a q-th degree of interest, order of delivery indicates that delivery of the p-th package is earlier than delivery of the q-th package, p is a natural number, q is a natural number, $1 \leq p$, $q \leq n$, and $p \neq q$, the hardware processor repeats determination of a class to which the i-th package belongs based on the i-th degree of interest, where i=1 to n, a first time span corresponding to a class to which the p-th package belongs is shorter than a second time span corresponding to a class to which the q-th package belongs, the hardware processor determines candidate delivery periods for the p-th package, the candidate delivery periods for the p-th package each have the first time span, the hardware processor determines candidate delivery periods for the q-th package, the candidate delivery periods for the q-th package each have the second time span, the communication circuit transmits the candidate delivery periods for the p-th package to a p-th terminal and the candidate delivery periods for the q-th package to a q-th terminal, the communication circuit obtains, from the p-th terminal, a p-th period selected from the candidate delivery periods for the p-th package and, from the q-th terminal, a q-th period selected from the candidate delivery periods for the q-th package, if a destination of an r-th package and a destination of the p-th package are in a same building and a class to which the r-th package belongs determined on a basis of an r-th degree of interest corresponds to the first time span, the hardware processor changes the class to which the r-th package belongs from the class corresponding to the first time span to a class corresponding to the second time span, where r is a natural number, $1 \leq r \leq n$, $r \neq p$, and $r \neq q$, the hardware processor determines candidate delivery periods for the r-th package, the candidate delivery periods for the r-th package each have the second time span, the communication circuit transmits the candidate delivery periods for the r-th package to an r-th terminal, the communication circuit obtains an r-th period selected from the candidate delivery periods for the r-th package from the r-th terminal, the hardware processor determines order of delivery of first to n-th packages on the basis of the p-th, q-th, and r-th periods, and the communication circuit transmits delivery order information indicating the order of delivery to a terminal provided for a delivery vehicle into which the first to n-th packages are loaded, wherein a screen indicating the order of delivery corresponding to the first to n-th packages is displayed on the terminal provided for the delivery vehicle based on the delivery order information, and a user determined to have a shortest period between the transmission time of the delivery notification information and the viewing time of the delivery notification information is determined to have a highest degree of interest and is listed first in the order of delivery on the screen.

* * * * *